(12) United States Patent
Karino

(10) Patent No.: US 8,717,884 B2
(45) Date of Patent: May 6, 2014

(54) ADDRESS-SHARING SYSTEM

(75) Inventor: Shuichi Karino, Tokyo (JP)

(73) Assignee: NEC Corporation, Tokyo (JP)

( * ) Notice: Subject to any disclaimer, the term of this patent is extended or adjusted under 35 U.S.C. 154(b) by 29 days.

(21) Appl. No.: 13/178,265

(22) Filed: Jul. 7, 2011

(65) Prior Publication Data

US 2011/0268121 A1 Nov. 3, 2011

Related U.S. Application Data

(63) Continuation of application No. PCT/JP2010/053971, filed on Mar. 10, 2010.

(30) Foreign Application Priority Data

Apr. 16, 2009 (JP) ................................ 2009-099853

(51) Int. Cl.
*G01R 31/08* (2006.01)
(52) U.S. Cl.
USPC .......................................... 370/229; 370/331
(58) Field of Classification Search
None
See application file for complete search history.

(56) References Cited

U.S. PATENT DOCUMENTS

| 6,785,843 | B1* | 8/2004 | McRae et al. ................... 714/23 |
| 7,447,804 | B2* | 11/2008 | Koo .............................. 709/249 |
| 8,059,530 | B1* | 11/2011 | Cole ............................ 370/229 |
| 8,270,369 | B1* | 9/2012 | Chang .......................... 370/331 |
| 2001/0032270 | A1 | 10/2001 | Koo |

FOREIGN PATENT DOCUMENTS

| JP | 2001-313676 A | 11/2001 |
| JP | 2004-193878 A | 7/2004 |
| JP | 2008-219531 A | 9/2008 |
| JP | 2009-021717 A | 1/2009 |
| WO | WO 2008/153193 A1 | 12/2008 |

OTHER PUBLICATIONS

Genba ITO, Korenara Wakaru Router, Network Magazine. vol. 8, No. 9. Sep. 2003, pp. 76-77.
Akimichi, TCP/IP Saishin Style 2008, Software Design, No. 215, Sep. 2008, pp. 53-61.
Takahiro Nuriya, NAT, IP Masquerade Kanzen Koryaku Junbihen, Nikkei Network, Nikkei Business Publications, Inc., Aug. 2002, pp. 54-57.
Bon Biro, ADO Programming Saizenzen, Visual Basic Magazine, vol. 8, No. 1, Dec. 2001, p. 5.
Nishitani, et al., Common Functions of Large Scale NAT (LSN), Internet-Draft, draft-nishitani-cgn-01, Nov. 2008, pp. 1-17.
Maennel, et al., A Better Approach than Carrier-Grade-NAT, 2008, Columbia University Technical Report CUCS-041-08, pp. 1-6.
Nick McKeown, et al., OpenFlow: Enabling Innovation in Campus Networks, ACM SIGCOMM Computer Communication Review, vol. 38, No. 2, Apr. 2008, pp. 69-74.
Japanese Office Action dated Nov. 1, 2013 with English translation thereof.

\* cited by examiner

*Primary Examiner* — Robert Wilson
(74) *Attorney, Agent, or Firm* — McGinn IP Law Group, PLLC

(57) ABSTRACT

Access routers (100-1 and 100-2) perform packet transfer using an IP address and a port number between a global network allowing mutual access using the IP address and a network other than the global network. Port resource assigning device (400) manages the port number in units of IP addresses, and, when performing the packet transfer, assigns the port number managed by means of the IP address preliminarily provided for access routers (100-1 and 100-2). Access routers (100-1 and 100-2) perform packet transfer using the IP address preliminarily provided for access router (100-1 and 100-2) and the port number assigned by port resource assigning device (400).

14 Claims, 21 Drawing Sheets

ADDRESS-SHARING SYSTEM

The present application is a Continuation Application of International Application No. PCT/JP2010/053971 filed on Mar. 10, 2010, which claims priority to Japanese Patent Application No. 2009-099853, filed on Apr. 16, 2009, both of which are incorporated herein in their entirety.

TECHNICAL FIELD

The present invention relates to an address-sharing system that shares an address, an access router, a port resource assigning device, a connection device, an address-sharing method, and a program.

BACKGROUND ART

In general, a packet transfer device, such as a router, in an IP (Internet Protocol) network has a mechanism that identifies a host node by means of the destination IP address of a packet, selects a packet distribution path according to the IP address and thus provides accessibility.

It is expected that addresses for IP version 4 (IPv4) will be exhausted in the near future. After exhaustion of addresses for IP version 4, no IPv4 address can be newly acquired. Thus, measures against a shortage of IPv4 addresses have been taken.

A NAPT (Network Address and Port Translator) device is widely used as means for connecting a network and the like constructed using private addresses to the Internet.

The NAPT device rewrites terminal point information of a packet passing though this device on the private network side. This allows host nodes connected to the private network to share one global address assigned to this device. Accordingly, consumption of IPv4 can be suppressed in comparison with a case of directly assigning a global address to the host node. Here, the terminal point information means a set of an IP address, a type of a transport protocol and a port number.

The NAPT device, however, shares the IP address. This generally prevents bidirectional accessibility from being secured between devices with intervention of the NAPT device. Further, the NAPT device requires managing the association between pieces of terminal point information before and after rewriting for each communication session. This increases the cost for processing packet transfer in comparison with routers. A table managing this association is hereinafter referred to as an address conversion table. Here, the communication session is a series of communications between two terminal points. Typically, a TCP (Transmission Control Protocol) connection is categorized as a session.

Accordingly, NAPT devices have widely been used in units of individuals and companies. However, an ISP (Internet Service Provider) and the like have not introduced the NAPT devices on a large scale. Here, the ISP is a connection provider that accommodates individuals, companies and the like and provides connection services therefor.

FIG. 1 is a diagram showing an example of a way of using a present Internet connection service.

Referring to FIG. 1, a configuration is shown where the ISP constructs an own network (ISP network 1000) to provide a connection service to the Internet, connects an end thereof to a device in Internet 3000 and another network via a router 2000, and arranges access routers 4000-1 and 4000-2 at another end and thereby accommodate individuals and companies, or users. Access routers 4000-1 and 4000-2 are connected to pieces of CPE (Customer Premises Equipment) 5000-1 to 5000-4, which are a user device having a function of connection with the ISP. CPE 5000-1 to 5000-4 of users are assigned with different global addresses GA1 to GA4, respectively.

However, in recent years, in order to address shortage of IPv4 addresses, an implementation where the ISP installs the NAPT device and provides users of the ISP with private addresses has been considered (e.g., see Non Patent Literature 1). In this case, the ISP installs the NAPT device at a border between a network for accommodating the users and the Internet. Since this network is typically large, this NAPT device is significantly larger than that widely used at present. Accordingly, this NAPT device is referred to as CGNAT (Carrier Grade Network Address Translator) discriminated from a typical NAPT device.

FIG. 2 is a diagram showing an example of a way of using an Internet connection service utilizing the CGNAT.

As shown in FIG. 2, CGNAT (CGNAT router) 6000 is installed at a border between ISP network 1000 and Internet 3000. ISP network 1000 may be configured using private addresses. Pieces of CPE 5000-1 to 5000-4 are assigned with different private addresses PA1 to PA4, respectively. When a packet of each user passes through CGNAT 6000, the private address assigned to this packet is reassigned with any one of global addresses GA1 to GAn assigned to CGNAT 6000. In this case, the port number is also rewritten. This allows users to share one global address using different port numbers on the single global address.

Here, the concern is that introduction of the CGNAT by the ISP causes following problems.

(1) It is generally difficult to realize a large NAPT device. One of causes thereof is the difficulty of designing a device having a large address conversion table and maintaining high throughput. Another cause is that, since appearance and disappearance of a connection in a transport layer is based on the appearance and disappearance of a session, an entry is required to be edited each time and thus it is difficult to secure redundancy of the address conversion table. Even if the device can be realized, the above problems cannot completely be solved. Accordingly, it is thought that this becomes a bottleneck of performance and a single point of failure.

(2) In a case where a user of the ISP has already introduced the NAPT device, the address is doubly converted. Accordingly, communication efficiency is reduced. Installation of the NAPT device by the ISP also prevents operation of a protocol (UPnP (Universal Plug and Play) etc.) for allowing access to a device presently on a private network side such as a NAPT device from the Internet side.

(3) The concern is that a private address used in the ISP network may overlap with a private address used by a user in an own network.

In order to solve the above problems, a system has been proposed that, instead of installing the NAPT device to accommodate the entire network, assigns the same IPv4 address to users, divides a port number space and assigns a divided part to each user (e.g. see Non Patent Literature 2). According to this system, each user accepts an IPv4 address where the extent of the port number is restricted. This allows the users to share the IPv4 address, thereby enables the amount of usage of the IPv4 address to be reduced.

Since the present device has not been designed to enable communication while restricting the extent of the port number, Non Patent Literature 2 proposes a following system.

(a) A port number converting device is installed between the host node and the access router of the ISP for each user. The port number is rewritten using the port number converting device.

(b) A protocol (DHCP (Dynamic Host Configuration Protocol) etc.) for issuing an address is extended, allowing the extent of the port number to be notified together with the address.

(c) The border router of the ISP for the Internet distributes a packet for those users who share the single address using not only the destination address but also the destination port. Here, a tunnel is set between the border router and the port number converting device of the user. This allows the address to be shared without modifying a router in the ISP network other than the border router.

FIG. 3 is a diagram showing an example of a way of using an Internet connection service utilizing the above systems (a) to (c).

As shown in FIG. 3, this configuration is provided with port resource assigning device 7000, which is the port number converting device described in above (a). Further, this configuration is also provided with tunnels 8000-1 to 8000-4 described in above (c).

The configuration shown in FIG. 3 can solve the problems in the aforementioned CGNAT in a following manner.

First, this negates the need for CGNAT 6000 residing at the border between Internet 3000 and ISP network 1000 as shown in FIG. 2. Accordingly, the difficulty of realizing CGNAT 6000 and the problems that may arise if it is introduced can be avoided.

In a case where the user has already introduced the NAPT device, the port number is rewritten in the NAPT device. Accordingly, address conversion does not become redundant.

The address issued by the ISP to the user is a global address. Accordingly, this address does not overlap with the private address space used by the user.

CITATION LIST

Non Patent Literature

Non Patent Literature 1: Nishitani, T., Miyakawa, S., Nakagawa, A., Ashida, H., "Common Functions of Large Scale NAT (LSN)", 2008. Internet-Draft, draft-nishitani-cgn-01.

Non Patent Literature 2: Maennel, O., Bush, R., Cittadini, L., Bellovin, S., "A Better Approach than Carrier-Grade-NAT", 2008, Columbia University Technical Report CUCS-041-08.

SUMMARY OF INVENTION

Technical Problem

However, there are following problems in the system described in Non Patent Literature 2.

A first problem is that the load on the border router becomes excessive. In the border router, it is not necessary to convert the address, but it is necessary to select a path of transferring the packet referring to the destination port. Typically, the border router of the ISP is required to exhibit high throughput. This is realized by implementing a routing table using a special device such as a TCAM (Ternary Content Addressable Memory). If the routing table includes the port number, the key length of the routing table becomes longer, which is a cause of reduction in performance.

A second problem is that, since the port number is necessarily converted, the cost as with the case of the NAPT device is required. More specifically, included in the cost are maintenance and management of the port number conversion table, recalculation of a checksum, and exception handling of a special higher layer protocol (FTP (File Transfer Protocol) etc).

A third problem is that, since addresses are steadily issued during connection, efficiency of using the port is low. Non Patent Literature 2 points out that it is more efficient to dynamically issue the port number, but does not describe a specific system.

An object of the present invention is to provide an address-sharing system, an access router, a port resource assigning device, a connection device, an address-sharing method and a program that solves the above problems.

Solution to Problem

An address-sharing system of the present invention comprises:

an access router connected to a global network allowing mutual access using only an IP address and a network other than the global network, and performing packet transfer between the networks using an address and a port number; and a port resource assigning device that manages the port number in a unit of the IP address and, when the packet transfer is performed, assigns the port number managed by means of the IP address preliminarily provided for the access router, wherein the access router performs the packet transfer using the IP address preliminarily provided for the access router and the port number assigned by the port resource assigning device.

An access router of the present invention connected to a global network allowing mutual access using only an IP address and a network other than the global network, and performing packet transfer between the networks using an address and a port number, performs the packet transfer using the IP address preliminarily provided for the access router and the port number assigned according to the IP address.

A port resource assigning device of the present invention manages a port number in a unit of an IP address and, when packet transfer is performed between a global network allowing mutual access using only the IP address and a network other than the global network, assigns an access router that performs the packet transfer with the port number managed by means of a preliminarily provided IP address for the sake of the packet transfer.

A connection device of the present invention connected to a global network allowing mutual access using only an IP address and a network other than the global network, and performing packet transfer between the networks using an address and a port number, in a case of having an NAPT function, performs control that rewrites the port number included in a header of the packet and to be used in the global network into a private port number usable in the network other than the global network, and, in a case of not having the NAPT function, controls the port number to be used by the connection device.

An address-sharing method of the present invention in an address-sharing system including an access router performing packet transfer and a port resource assigning device assigning a port number to be used for the packet transfer, includes:

a process where the port resource assigning device manages the port number in a unit of the IP address;

a process where the port resource assigning device, when performing the packet transfer between a global network allowing mutual access using only the IP address and a network other than the global network, assigns the access router with the port number managed by means of the IP address preliminarily provided for the access router; and a process where the access router performing the packet transfer using the IP address preliminarily provided for the access router and the port number assigned by the port resource assigning device.

A program of the present invention causes an access router connected to a global network allowing mutual access using only an IP address and a network other than the global network, and performing packet transfer between the networks using an address and a port number to execute a procedure of performing the packet transfer using the IP address preliminarily provided for the access router and the port number assigned according to the IP address.

A program of the present invention causes a computer to perform:

a procedure of managing a port number in a unit of the IP address; and a procedure where, when packet transfer is performed between a global network allowing mutual access using only the IP address and a network other than the global network, the procedure assigns the port number managed by means of an IP address preliminarily provided for an access router that performs the packet transfer for the sake of the packet transfer.

A program of the present invention causes a connection device connected to a global network allowing mutual access using only an IP address and a network other than the global network, and performing packet transfer between the networks using an address and a port number to execute:

a procedure where the connection device, in a case of having an NAPT function, performs control that rewrites the port number included in a header of the packet and to be used in the global network into a private port number usable in the network other than the global network; and a procedure where the connection device, in a case of not having the NAPT function, controls the port number to be used by the connection device.

Advantageous Effects of Invention

As described above, the present invention adopts the configuration where connection is established to a global network allowing mutual access using only an IP address and a network other than the global network, an access router performs packet transfer between the networks using an address and a port number, a port resource assigning device manages the port number in a unit of the IP address, and, when performing the packet transfer, assigns the port number managed by means of the IP address preliminarily provided for the access router. The access router performs the packet transfer using the IP address preliminarily provided for the access router and the port number assigned by the port resource assigning device. Accordingly, path control efficiently using the port number can readily be performed.

DESCRIPTION OF EMBODIMENTS

Exemplary embodiments of the present invention will hereinafter be described with reference to the drawings.

Figure 1:
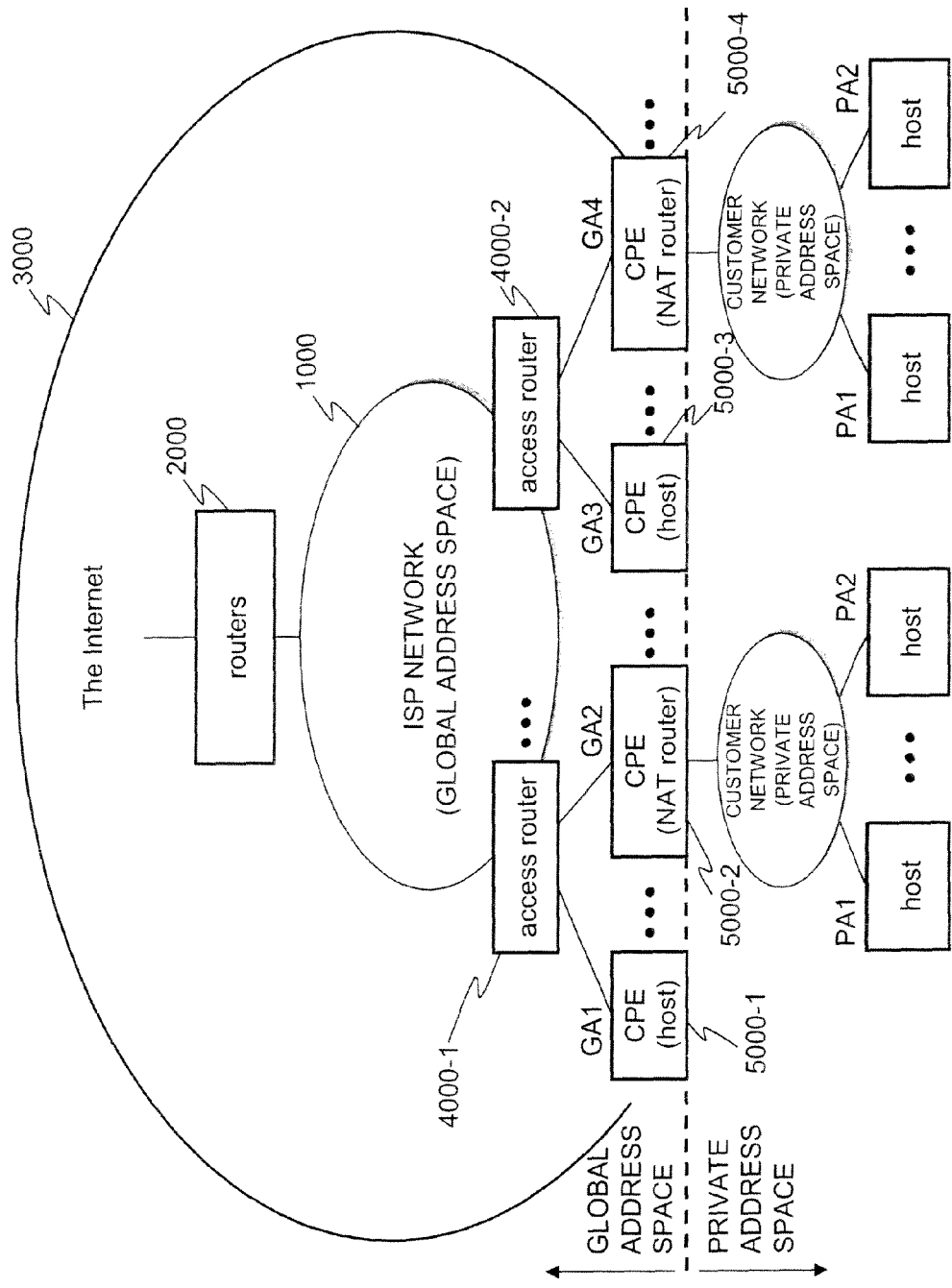
FIG. 1 is a diagram showing an example of how to use a present Internet connection service.
Figure 2:
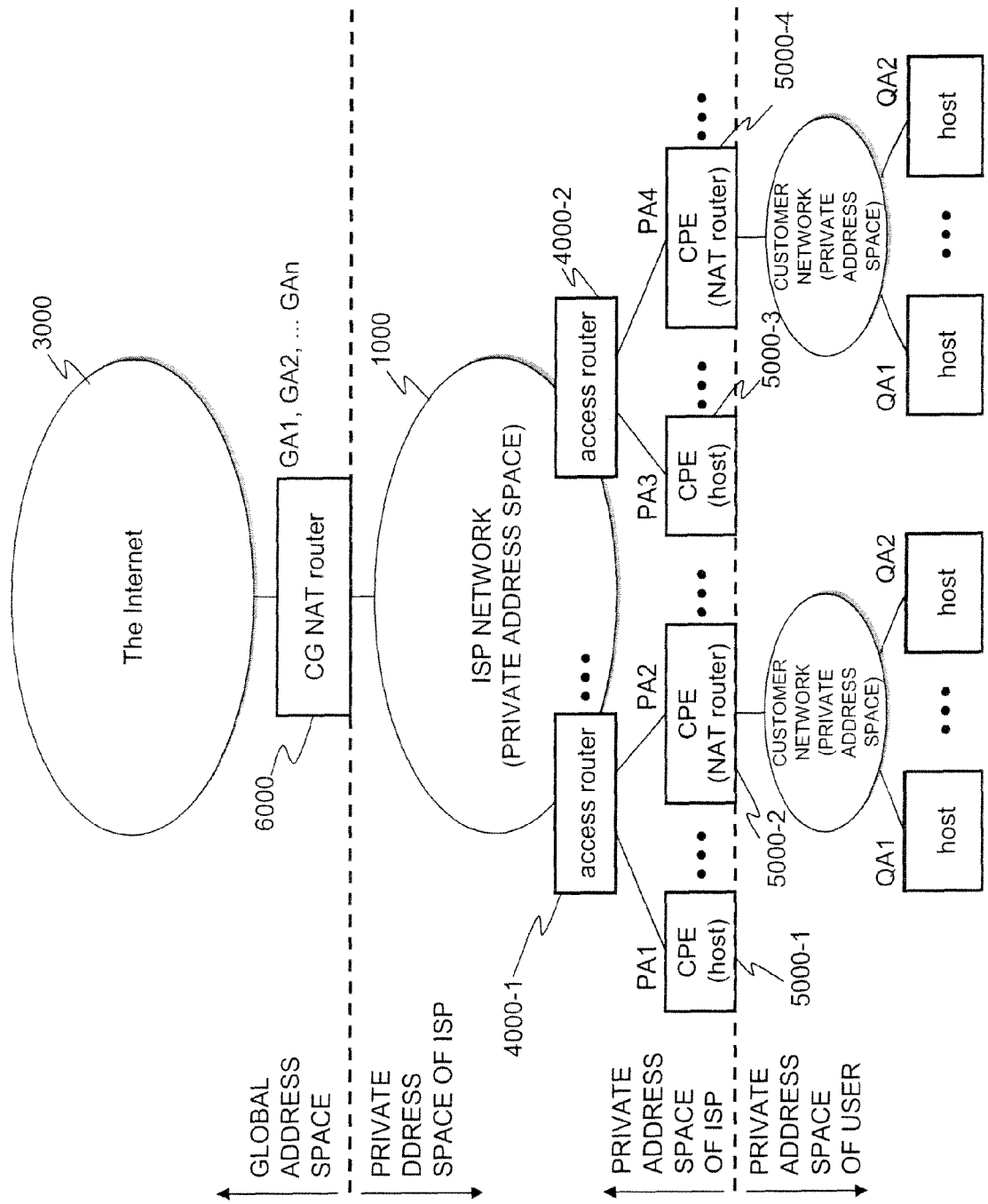
FIG. 2 is a diagram showing an example of how to use an Internet connection service utilizing the CGNAT.
Figure 3:
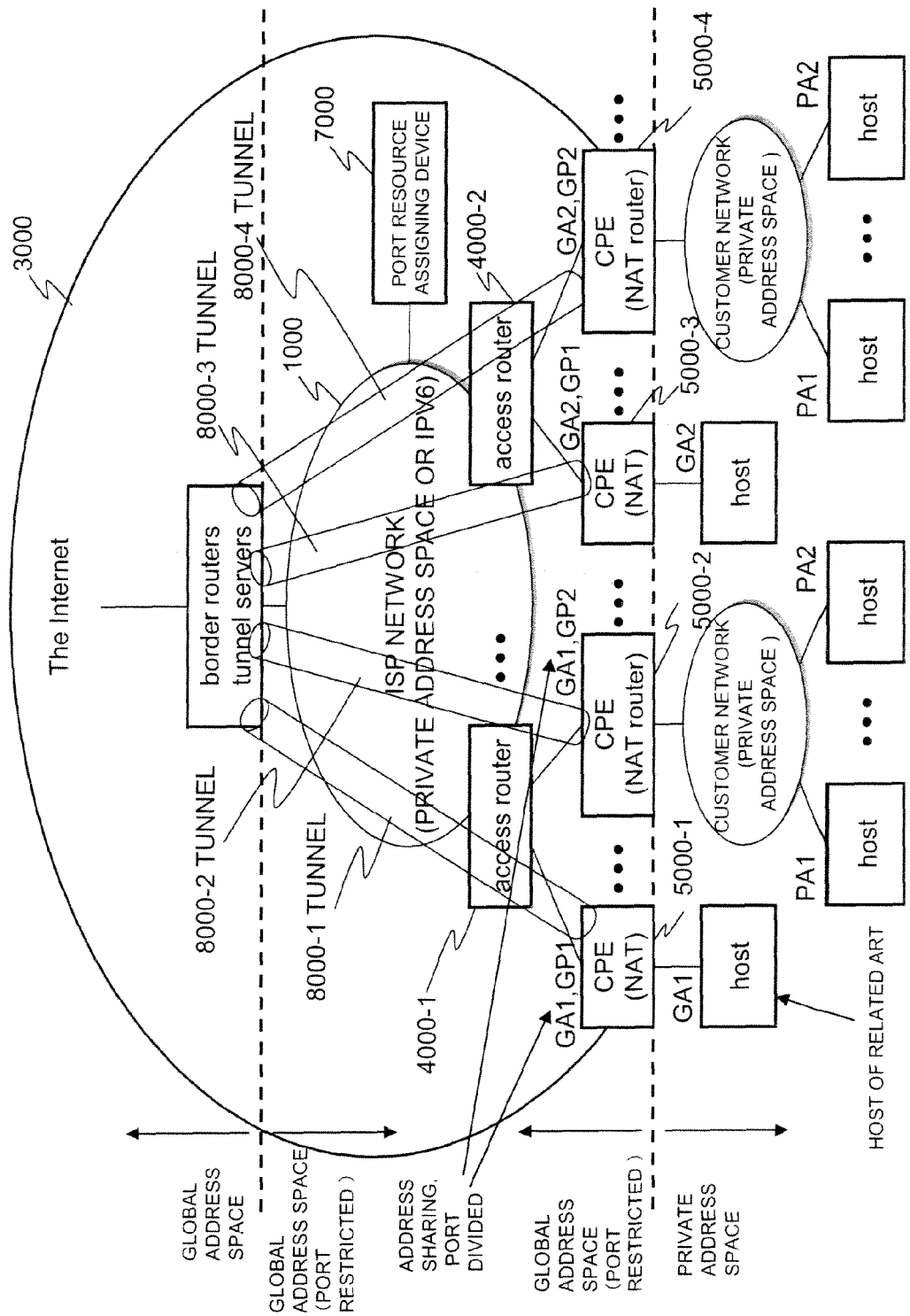
FIG. 3 is a diagram showing an example of how to use an Internet connection service utilizing the above systems (a) to (c).
Figure 4:
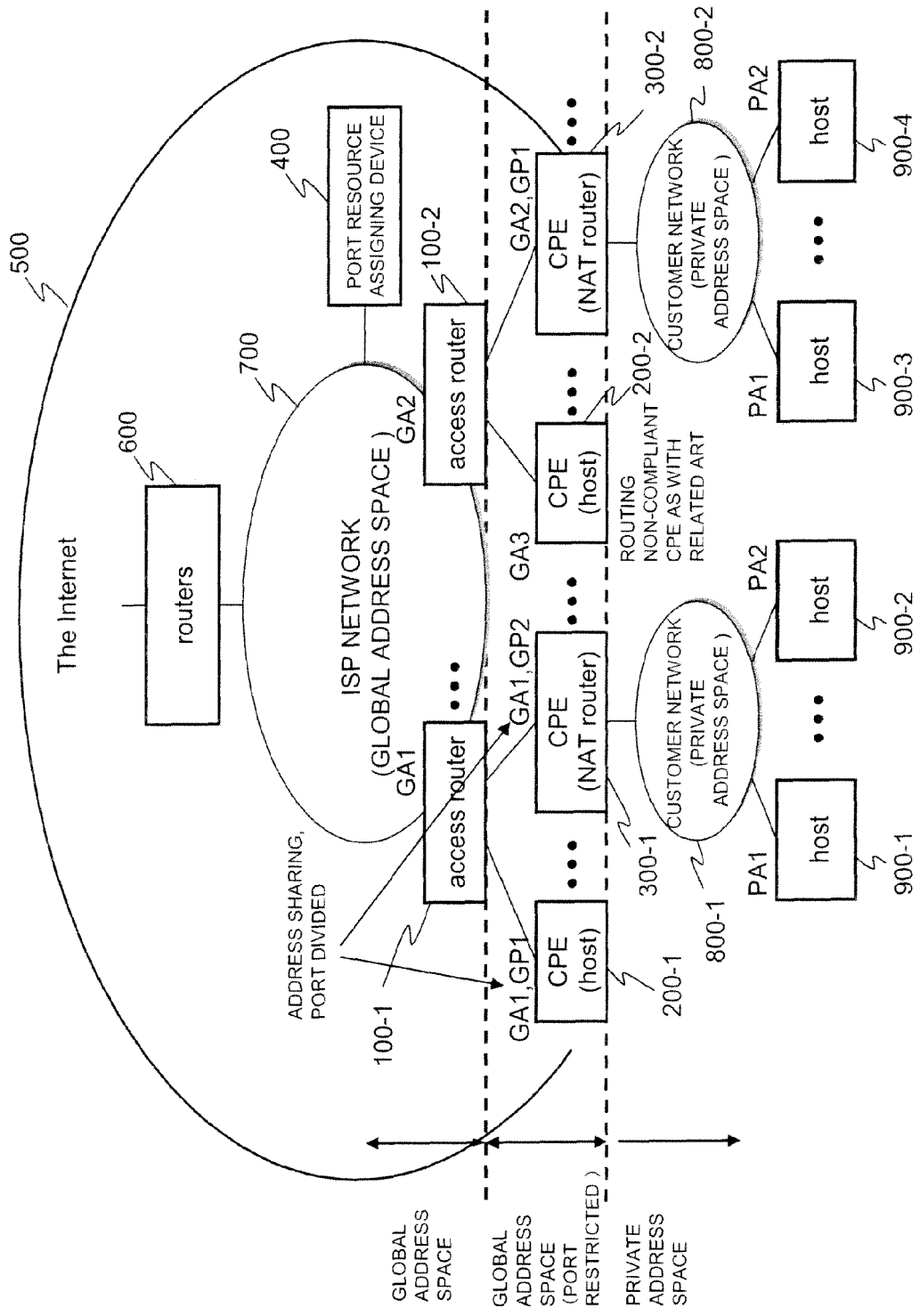
FIG. 4 is a diagram showing an example of how to use an Internet connection service (address-sharing system) to which the present invention is applied.

FIG. 4 is a diagram showing an example of how to use an Internet connection service (address-sharing system) to which the present invention is applied.

As shown in FIG. 4, this exemplary embodiment has a configuration where, in the Internet 500 that is a global network allowing mutual access using only IP (Internet Protocol) addresses, router 600 and ISP network 700 are connected to each other, ISP network 700 is connected to port resource assigning device 400 and access routers 100-1 and 100-2, access router 100-1 is connected to CPE 200-1 and 300-1, and access router 100-2 is connected to CPE 200-2 and 300-2. Further, CPE 300-1 and 300-2 are connected to an external network of the Internet 500.

Access routers 100-1 and 100-2 are routers that reside at ends of a network (ISP network 700) constructed by an ISP and accommodate a transmission path connected to the users. Access routers 100-1 and 100-2 are preliminarily assigned with global addresses (GAn).

CPE 200-1, 200-2, 300-1 and 300-2 are connection devices that reside at locations and houses of users and accommodate transmission paths connected to ISP network 700. CPE 200-1, 200-2, 300-1 and 300-2 connect the global network and the other networks. CPE 200-1, 200-2, 300-1 and 300-2 function as routers in one case and function as host nodes in another case.

CPE 300-1 and 300-2 are illustrated for the case of functioning as routers, connected to private networks (customer network: e.g. a network provided in a private space where private addresses function) 800-1 and 800-2 other than the transmission path to the ISP network 700. Private networks 800-1 to 800-2 thereof are connected with hosts 900-1 to 900-4, which are terminal devices of the host node, other than the CPE, and the router.

CPE 200-1 and 200-2 are illustrated for the case of functioning as the host nodes.

First Exemplary Embodiment

Figure 5:
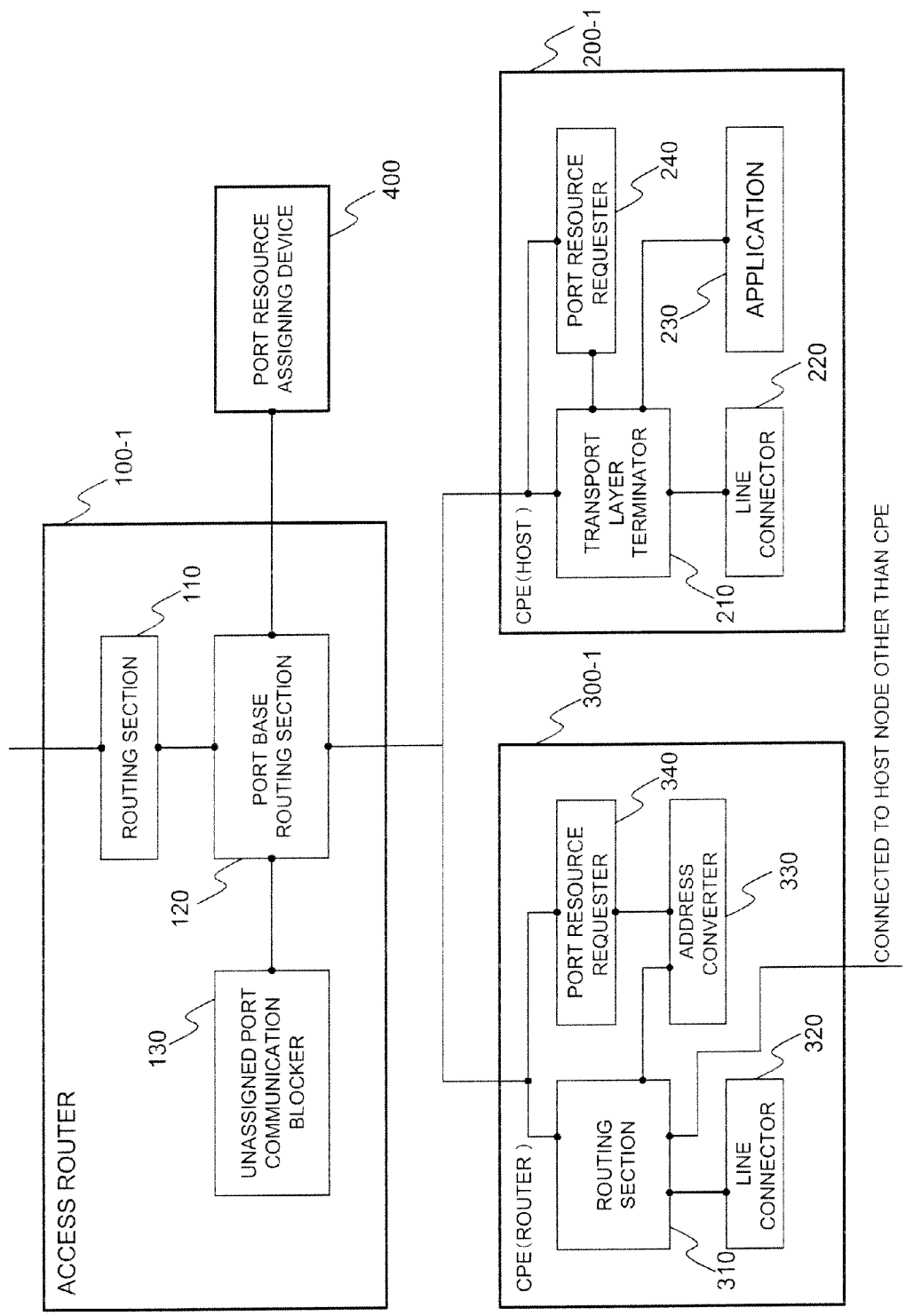
FIG. 5 is a block diagram showing an example of internal configurations of an access router and CPE shown in FIG. 4 in a first exemplary embodiment.

FIG. 5 is a block diagram showing an example of internal configurations of access router 100-1, CPE 200-1 and CPE 300-1 shown in FIG. 4 in a first exemplary embodiment. Access router 100-1 shown in FIG. 4 and access router 100-2 have the same configuration and function; CPE 200-1 and CPE 200-2 have the same configuration and function; CPE 300-1 and CPE 300-2 have the same configuration and function.

Access router 100-1 shown in FIG. 4 includes routing section 110, port base routing section 120 and unassigned port communication blocker 130, as shown in FIG. 5. Access router 100-1 is connected to port resource assigning device 400.

Routing section 110 has a routing function as with a typical router.

Unassigned port communication blocker 130 blocks traffic that uses an inappropriate port number.

Figure 6:
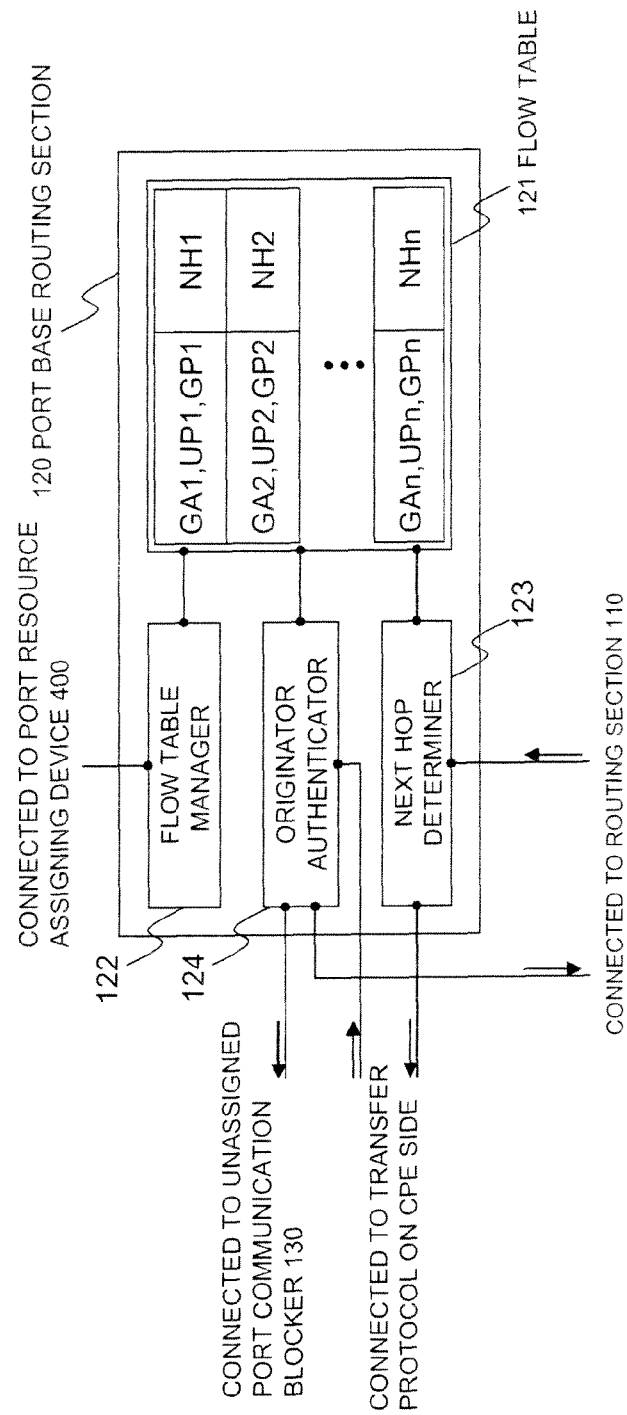
FIG. 6 is a block diagram showing an example of an internal configuration of a port base routing section shown in FIG. 5.

FIG. 6 is a block diagram showing an example of an internal configuration of port base routing section 120 shown in FIG. 5.

Port base routing section 120 shown in FIG. 5 includes flow table 121, flow table manager 122, next hop determiner 123 and originator authenticator 124, as shown in FIG. 6.

Flow table 121 holds path information for each terminal point and has a function of retrieving the path information using the terminal point information as a key. FIG. 5 shows an example of a minimum configuration of flow table 121. In flow table 121, flow table entries are represented in a table with two columns. A first column includes a set of a destination address (GAn) that is a global address of a destination, transport protocol type (UPn) and destination port number (GPn). A second column includes next hop identification information (NHn).

Flow table manager 122 has a function of adding and deleting a flow table entry. Flow table manager 122 is connected to port resource assigning device 400 shown in FIG. 5.

Next hop determiner 123 has a function of searching flow table 121 and determining the next hop.

Originator authenticator 124 has a function of searching flow table 121 and verifies appropriateness of an originator.

CPE 200-1 shown in FIG. 4 includes transport layer terminator 210, line connector 220, application 230 and port resource requester 240, as shown in FIG. 5.

Line connector 220 and application 230 have the same function as that of a typical CPE.

Figure 7:
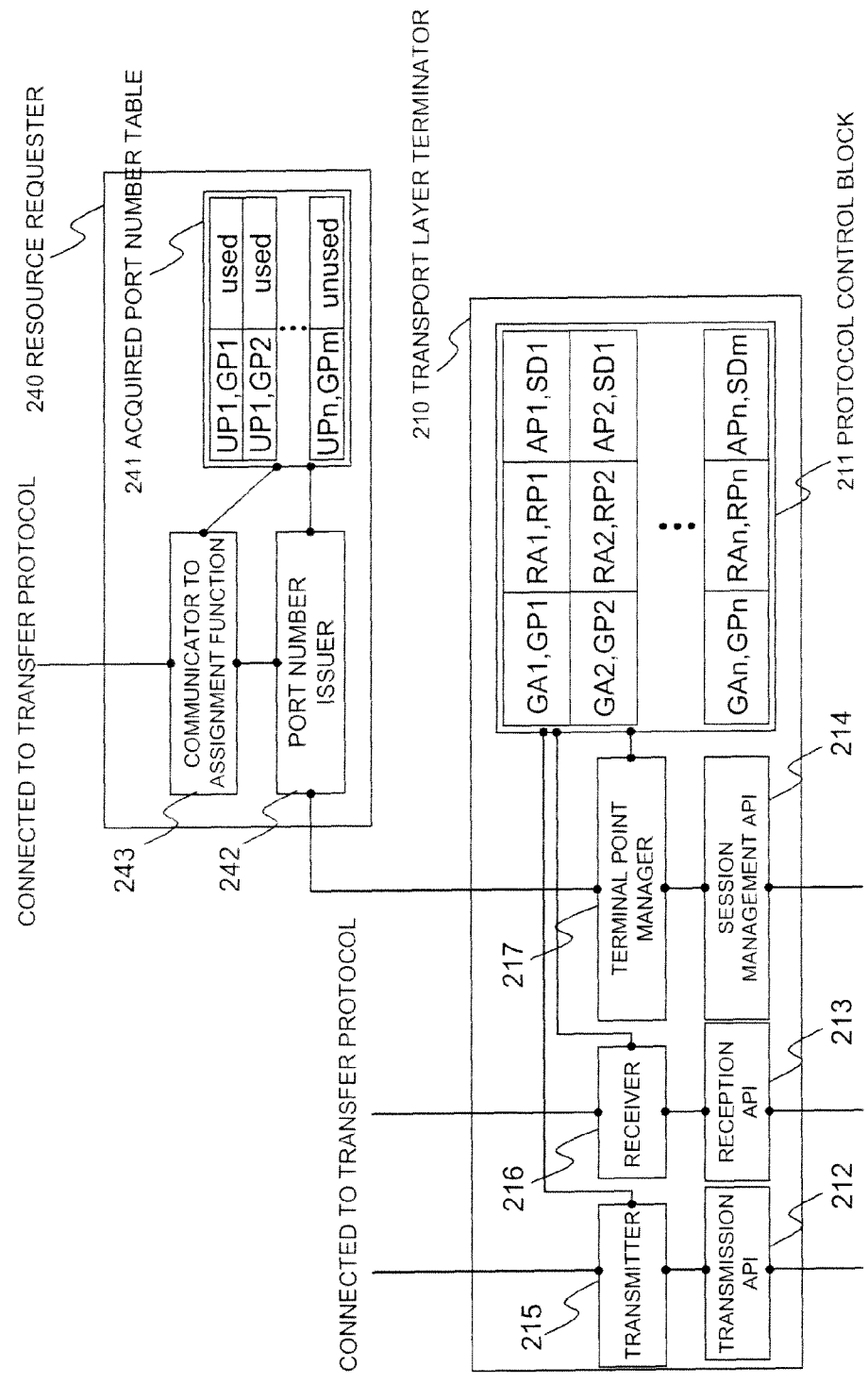
FIG. 7 is a block diagram showing an example of internal configurations of a transport layer terminator and a port resource requester shown in FIG. 5.

FIG. 7 is a block diagram showing an example of internal configurations of transport layer terminator 210 and port resource requester 240 shown in FIG. 5.

Transport layer terminator 210 shown in FIG. 5 includes protocol control block (PCB) 211, transmission API 212, reception API 213, session management API 214, transmitter 215, receiver 216 and terminal point manager 217, as shown in FIG. 7.

Protocol control block (PCB) 211 resides for each protocol type, and has a function of holding, for each session, terminal point information of the own host and a communication destination, a related protocol parameter, an application using the session, a session descriptor number used by the application. FIG. 7 shows an example of a minimum configuration of protocol control block (PCB) 211. In protocol control block (PCB) 211, PCB entries are represented in a table with three columns. A first column includes address (GAn) and port number (GPn) on the own host side. A second column includes address (RAn) and port number (RPn) on the opposite host side. A third column includes application identifier (APn) and session descriptor number (SDn) used by the application.

APIs, or transmission API 212, reception API 213 and session management API 214, are called interfaces from the applications corresponding to respective processes, and have functions identical to those included in a typical host node.

Transmitter 215 and receiver 216 have functions identical to those included in the typical host node.

Terminal point manager 217 has a function that, when the host node opens/closes a session, terminal point manager 217 creates/deletes a terminal point used for the session. Particularly, in the present invention, this manager includes a function of acquiring a port number used for the terminal point from a port resource request function.

Port resource requester 240 shown in FIG. 5 includes acquired port number table 241, port number issuer 242, and communicator 243 to an assignment function, as shown in FIG. 7.

Acquired port number table 241 holds a list of port numbers (GA1 to GAn) assigned to CPE 200-1, and manages usage states. The usage states records the distinction between minimum active/unassigned. FIG. 7 shows an example of the minimum configuration of acquired port number table 241. In acquired port number table 241, acquired port number entries are represented in a table with two columns. The first column includes acquired port number (GPn) and corresponding protocol type (UPm). The second column includes information about a distinction between use/unassigned of the port concerned.

Port number issuer 242 has a function that issues a port number from acquired port number table 241 responsive to a request by another functional section and, without an unassigned port number, newly acquires an auto number using communicator 243 to assignment function.

Communicator 243 to the assignment function has a function of communicating with port resource assigning device 400. Note that a specific communication method is not described here.

CPE 300-1 shown in FIG. 4 includes routing section 310, line connector 320, address converter 330 and port resource requester 340, as shown in FIG. 5. In general, there is CPE of a router that does not include address converter 330. However, in this exemplary embodiment, CPE 300-1 is described as an exceptional case.

Routing section 310 has a routing function identical to that of a typical router.

Line connector 320 includes a function identical to that of a typical CPE.

Figure 8:
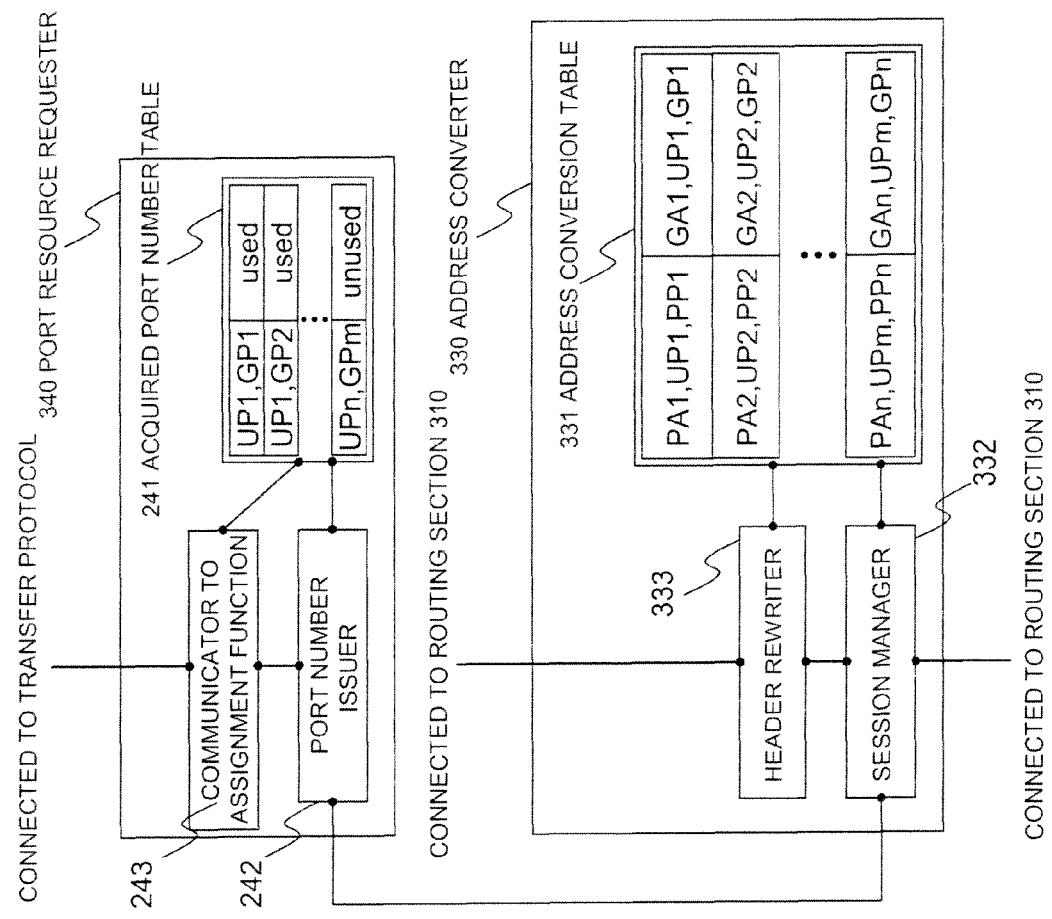
FIG. 8 is a block diagram showing an example of internal configurations of an address converter and a port resource requester shown in FIG. 5.

FIG. 8 is a block diagram showing an example of the internal configurations of address converter 330 and port resource requester 340 shown in FIG. 5.

Address converter 330 shown in FIG. 5 includes address conversion table 331, session manager 332 and header rewriter 333, as shown in FIG. 8.

Address conversion table 331 holds a set of terminal point information on a private side and corresponding terminal point information on a global side, and can be searched using a private terminal point or a global terminal point. FIG. 8 shows an example of a minimum configuration of address conversion table 331. In address conversion table 331, address conversion entries are represented in a table with two columns. The first column holds address (private address) (PAn), transport protocol type (UPm) and port (private port) number (PPn) of a session terminal point (terminal device) actually used by the host node on the private network side. The second column holds analogous information of a session terminal point when a packet reaches the global network side.

Session manager 332 has a function of detecting whether a packet to be address-converted is a packet for starting a session or a packet for completing a session, a function of requesting a global port number from port resource requester 340, as necessary, and a function of updating address conversion table 331 according to these functions.

Header rewriter 333 has a function of rewriting header information of a packet according to information of address conversion table 331 and performing required correction of a packet (recalculation of a checksum etc.) along with the rewriting.

Port resource requester 340 shown in FIG. 5 includes acquired port number table 241 shown in FIG. 7, port number issuer 242, and communicator 243 to assignment function, as shown in FIG. 8, and has functions identical to those described using FIG. 7.

Figure 9:
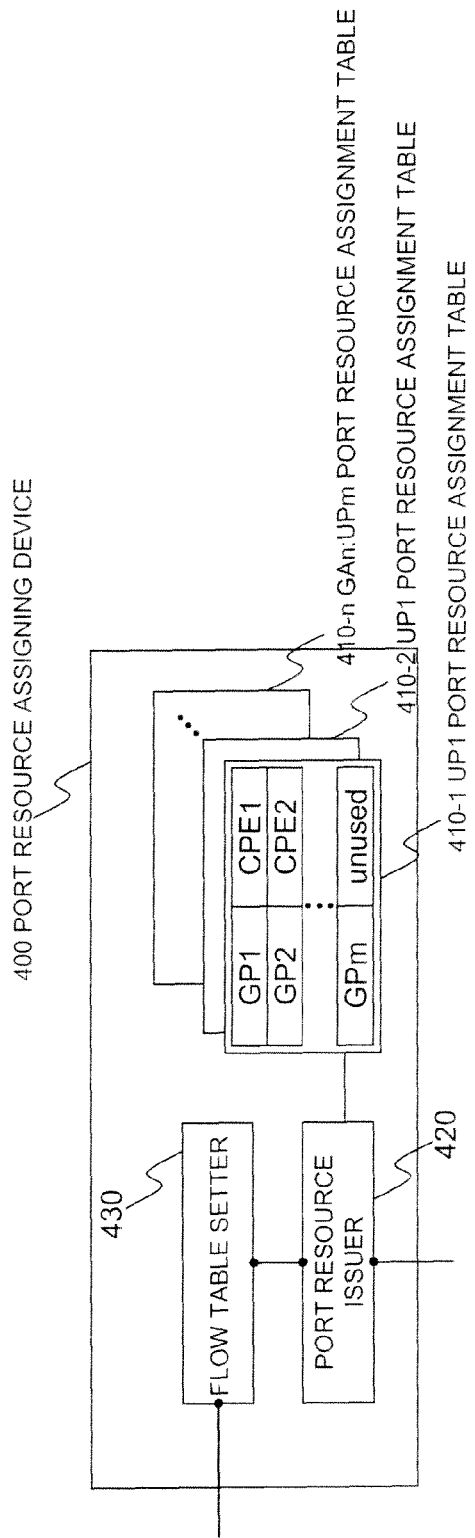
FIG. 9 is a block diagram showing an example of an internal configuration of a port resource assigning device shown in FIG. 5.

FIG. 9 is a block diagram of an example of an internal configuration of port resource assigning device 400 shown in FIG. 5.

Port resource assigning device 400 shown in FIG. 5 includes port resource assignment tables 410-1 to 410-n, port resource issuer 420 and flow table setter 430, as shown in FIG. 9.

Port resource assignment tables 410-1 to 410-n are separately provided with respect to each address of a global IP address and each transport protocol type (unit) on which port resource assigning device 400 manages a port resource. Each table records CPE of the assignment destination, using a port number as a key therefor. For example, port resource assignment table 410-1 shows an example of a minimum configuration of a port resource assignment table for address (global address) GA1 and transport protocol UP1. In port resource assignment tables 410-1 to 410-n, port resource assignment entries are represented in a table with two columns. The first column includes a port number (GPn) to be assigned. The second column includes identifier (CPE n) of CPE of the assignment destination.

Port resource issuer 420 has a function of referring to port resource assignment tables 410-1 to 410-n and assigning a port resource to the CPE in response to a request to assign the port resource by the CPE.

Flow table setter 430 has a function of setting, to access router 100-1, a flow table entry pertaining to a terminal point acquired from port number GP assigned to the CPE by port resource issuer 420 and global address GA assigned to the CPE.

Operation of this exemplary embodiment will hereinafter be described using diagrams.

The operation of this exemplary embodiment can roughly be put in order as follows.

1. Operation when a session is started
1.1 Operation of the CPE
1.1.1 Operation in a case where the CPE is the host node
1.1.2 Operation in a case where the CPE is the NAPT
1.2 Operation of the port resource assigning device and the access router
2. Operation on packet transfer
2.1 Operation of the access router
3. Operation when the session is completed
3.1 Operation of the CPE
3.1.1 Operation in the case where the CPE is the host node
3.1.2 Operation in the case where the CPE is the NAPT
3.2 Operation of the port resource assigning device and the access router
4. Operation in a case of a router where the CPE does not include the NAPT function.

The description is hereinafter made according to the above order. Note that, in the following description, the information of transport protocol type indicated in the description on the configuration is omitted, for the sake of simplicity.

1. Operation when a Session is Started

Since the operation when a session is started is complicated, an overview of the operation will be described first. Here the description will be made using an example of a case where the start of a session is completed in two ways.

Figure 10:
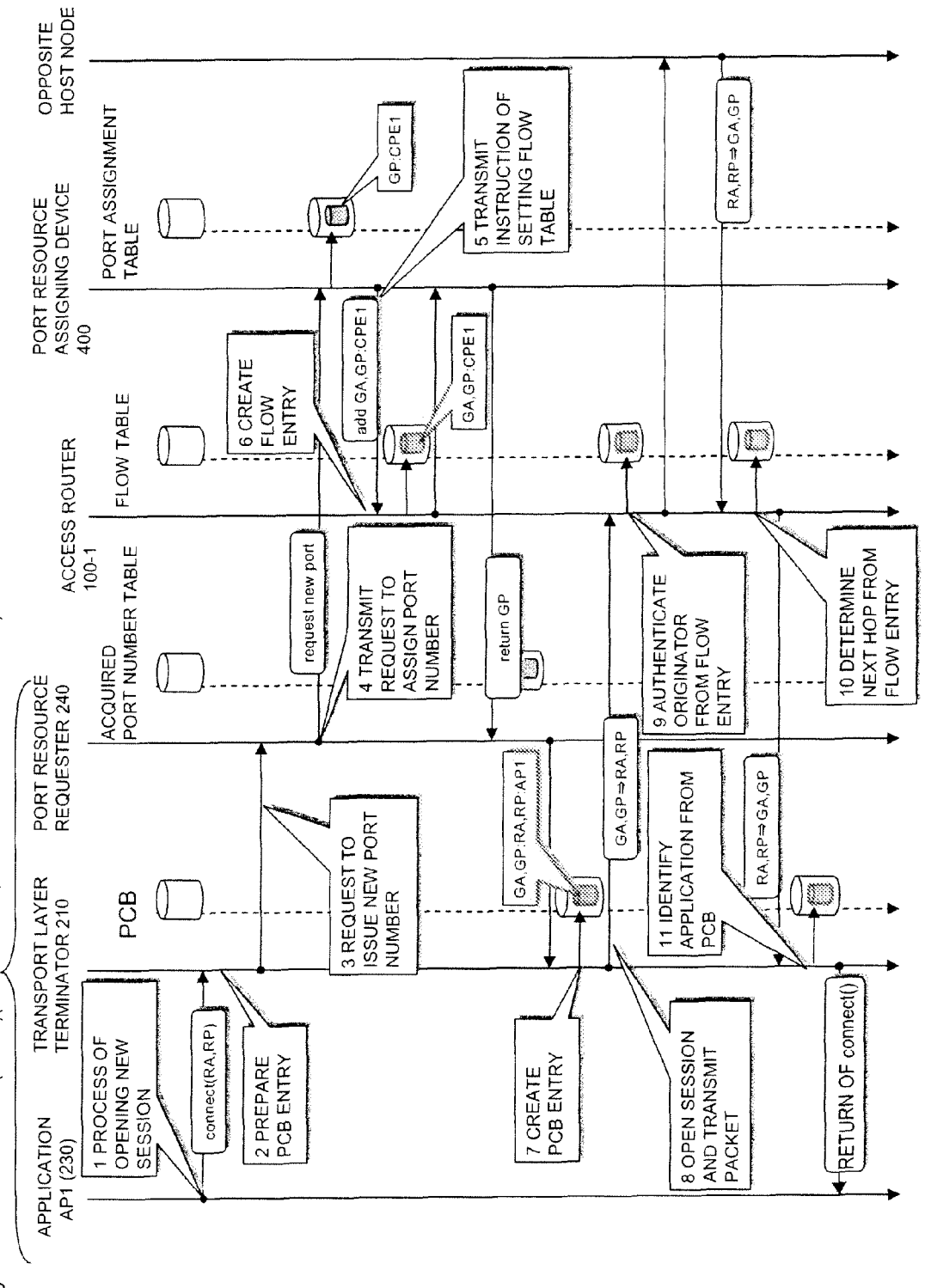
FIG. 10 is a sequence diagram for illustrating an example of a series of operations when a session performed by a host node, or CPE, is started in the first exemplary embodiment.

FIG. 10 is a sequence diagram for illustrating an example of a series of operations when a session performed by the host node, or CPE, is started in the first exemplary embodiment.

Referring to FIG. 10, in step 1, when a communication session is started, in host node CPE 200-1 (hereinafter, CPE 1), application 230 (hereinafter, AP1) calls a session open API ("connect" in the example of the figure) and then, for creation of an entry in PCB in step 2, a request to issue a port number is transmitted from transport layer terminator 210 to port resource requester 240 in step 3. In this example, there is no vacant port. Accordingly, in step 4, a request to assign a port number is transmitted to port resource assigning device 400. Round rectangles in the figures represent communication details (or packets) between nodes.

Port resource assigning device 400 assigns port number GP1 to CPE 1 in step 5, instructs access router 100-1 to creates a flow table entry in access router 100-1 using the set of address GA1 of CPE 1 and assigned port number GPI as a key in step 6 and, if this succeeds, the port number is responsively transmitted to CPE 1.

CPE 1 creates a PCB entry regarding the acquired port number as a terminal point on the local side in step 7, and communication for starting a session is started in step 8.

In step 9, the originator of a session opening packet transmitted from CPE 1 is verified by means of the flow entry of access router 100-1. In step 10, the transmission path of a response packet from the opposite node to CPE 1 is determined by means of the flow entry.

Finally, the PCB is retrieved based on the packet reached at CPE 1, and in step 11 transport layer terminator 210 identifies the application and then notifies the application of completion of starting the session.

Next, a case where the CPE is the NAPT will be described.

Figure 11:
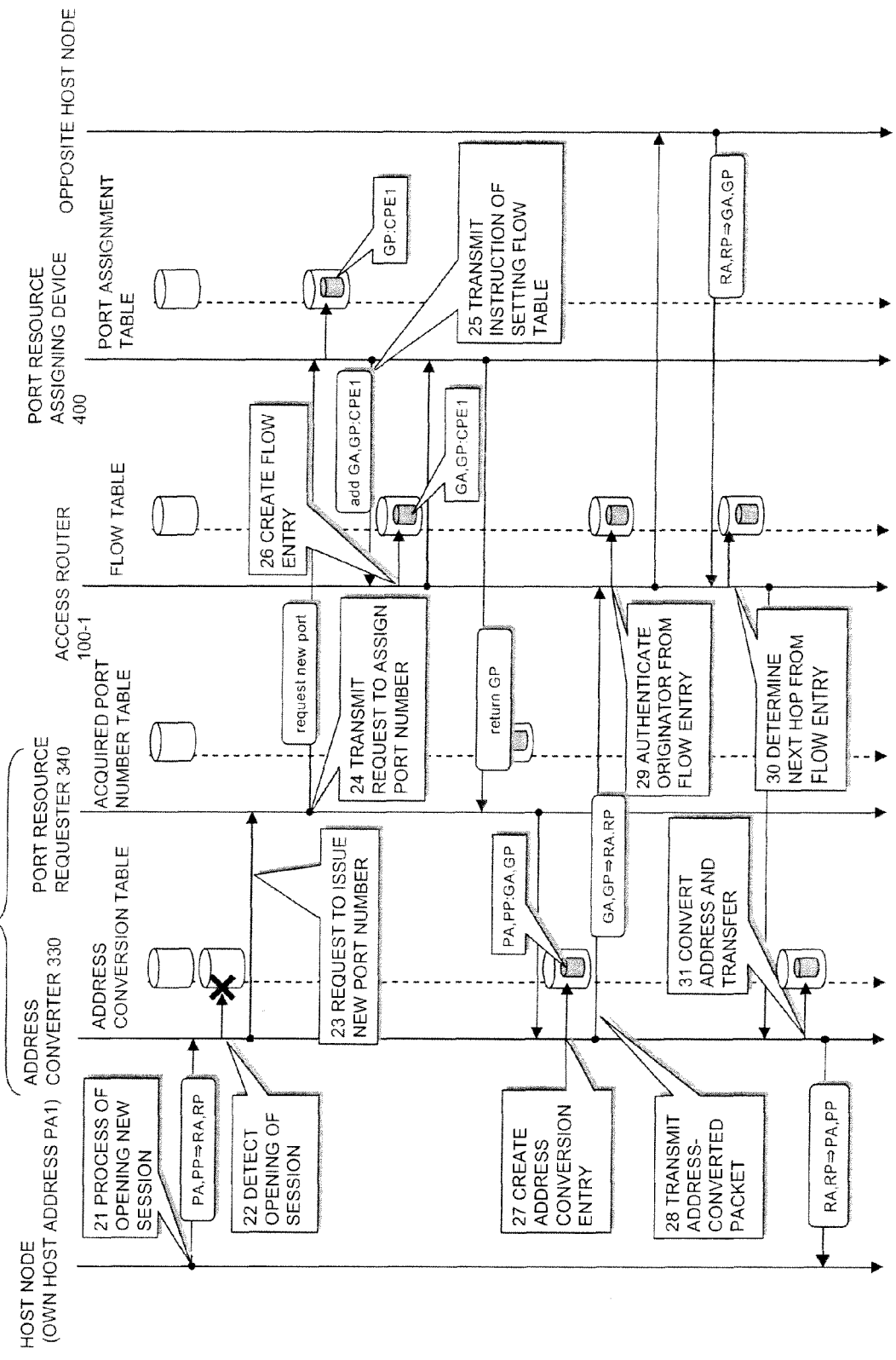
FIG. 11 is a sequence diagram for illustrating an example of a series of operations when a session performed by a NAPT node, or CPE, is started in the first exemplary embodiment.

FIG. 11 is a sequence diagram for illustrating an example of a series of operation when a session performed by a NAPT node, or CPE, is started in the first exemplary embodiment.

Referring to FIG. 11, when a communication session is started, the host node connected to the private network accommodated in CPE 300-1 (hereinafter, CPE 1) transmits a session starting packet to the opposite party of communication in step 21. Note that, in contrast to the host node as the CPE, the host node does not have a function of acquiring a global port number by itself.

When the packet transmitted from the host node reaches CPE 1, address converter 330 detects that there is no address conversion entry corresponding to the packet and the packet indicates to open the session in step 22. In order to create an address conversion entry in CPE 1, a request to issue a port number is transmitted from address converter 330 to port resource requester 340 in step 23.

The subsequent flow up to acquisition of the port number in steps 24 to 26 is identical to operations in the respective steps 4 to 6.

CPE 1 creates the address conversion entry regarding the acquired port number GP1 as terminal point information on the global side in step 27, rewrites the terminal point of the originator of the packet received from the host node as described above into GA1 and GP1 and then transmits the rewritten packet in step 28.

The subsequent flow in access router 100-1 in steps 29 and 30 is identical to operation in the respective steps 9 and 10.

When the packet from the opposite node reaches CPE 1, the terminal point of the destination of the packet is rewritten into private address PA1 and private port number PP1 on the basis of information of the address conversion entry in step 31. The host node then receives this as the packet destined for the own host.

The above description is on the major part of the flow of starting the session. Individual operation of each device will hereinafter be described.

1.1 Operation of the CPE

1.1.1 Operation in a Case where the CPE is the Host Node

Figure 12:
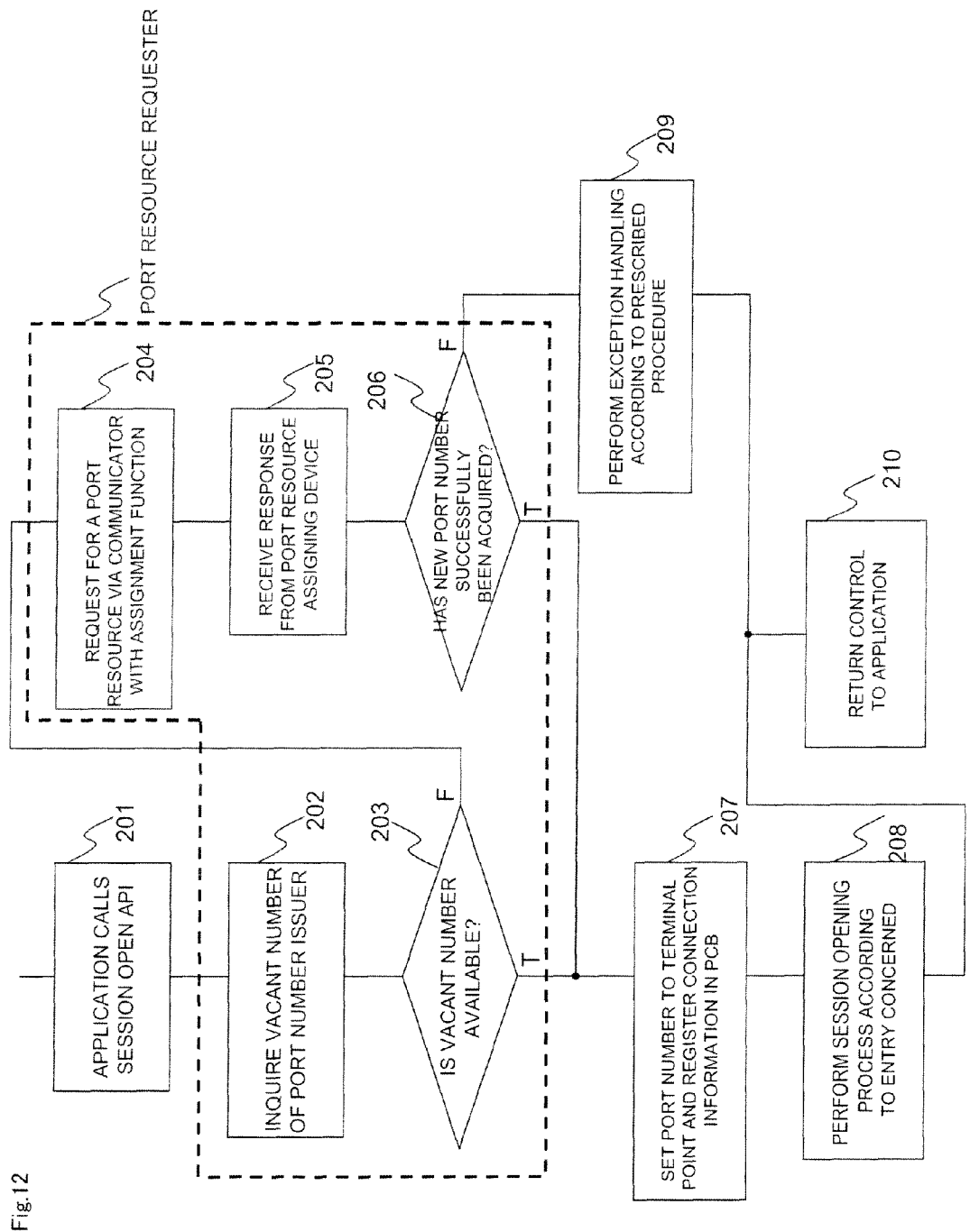
FIG. 12 is a flowchart for illustrating an example of a series of operations when a session performed by the host node, or CPE, is started in the first exemplary embodiment.

FIG. 12 is a flowchart for illustrating an example of a series of operations when a session performed by the host node, or CPE, is started in the first exemplary embodiment. A part of operation encircled by broken lines in the operation shown in FIG. 12 is the operation of port resource requester 240, and the other is the operation of transport layer terminator 210.

The process for starting the session is driven by the application. Referring to FIG. 12, in step 201, application 230 calls a session open API of transport layer terminator 210.

In order to acquire a port number required for the terminal point of the session on the own host side, transport layer terminator 210 inquires of port resource requester 240 whether or not the acquired vacant port is present in step 202.

In step 203 it is determined whether or not a vacant port is available. If the vacant port is unavailable, port resource requester 240 transmits a request for a port resource from port resource assigning device 400 via a communicator with port resource assigning device 400 in step 204.

The operation in port resource assigning device 400 will separately be described. Protocols of a request and a response and the like may be those using a typical protocol and the like, which is not specifically described here.

When a response from port resource assigning device 400 is received in step 205, port resource requester 240 verifies the details thereof and determines whether or not the port number has been transmitted in step 206. If the port number has been transmitted, the transmitted port number is passed to transport layer terminator 210 via port number issuer 242.

Transport layer terminator 210 creates the port number and the terminal point using the IP address issued on connection of the line in step 207, and performs a process for starting a session in step 208. If the port number is available in step 203, the operation in step 207 is performed.

Subsequently, if the session opening process is completed, the API call is completed with a normal completion as a return value and returns the control to application 230 in step 210.

If a new port cannot be acquired in step 206, a prescribed exception handling is performed in step 209. The details of exception handling vary according to protocol and the like. Typically, an error is returned to the API call that is made to start the session.

1.1.2 Operation in a Case where the CPE is the NAPT Node

Figure 13:
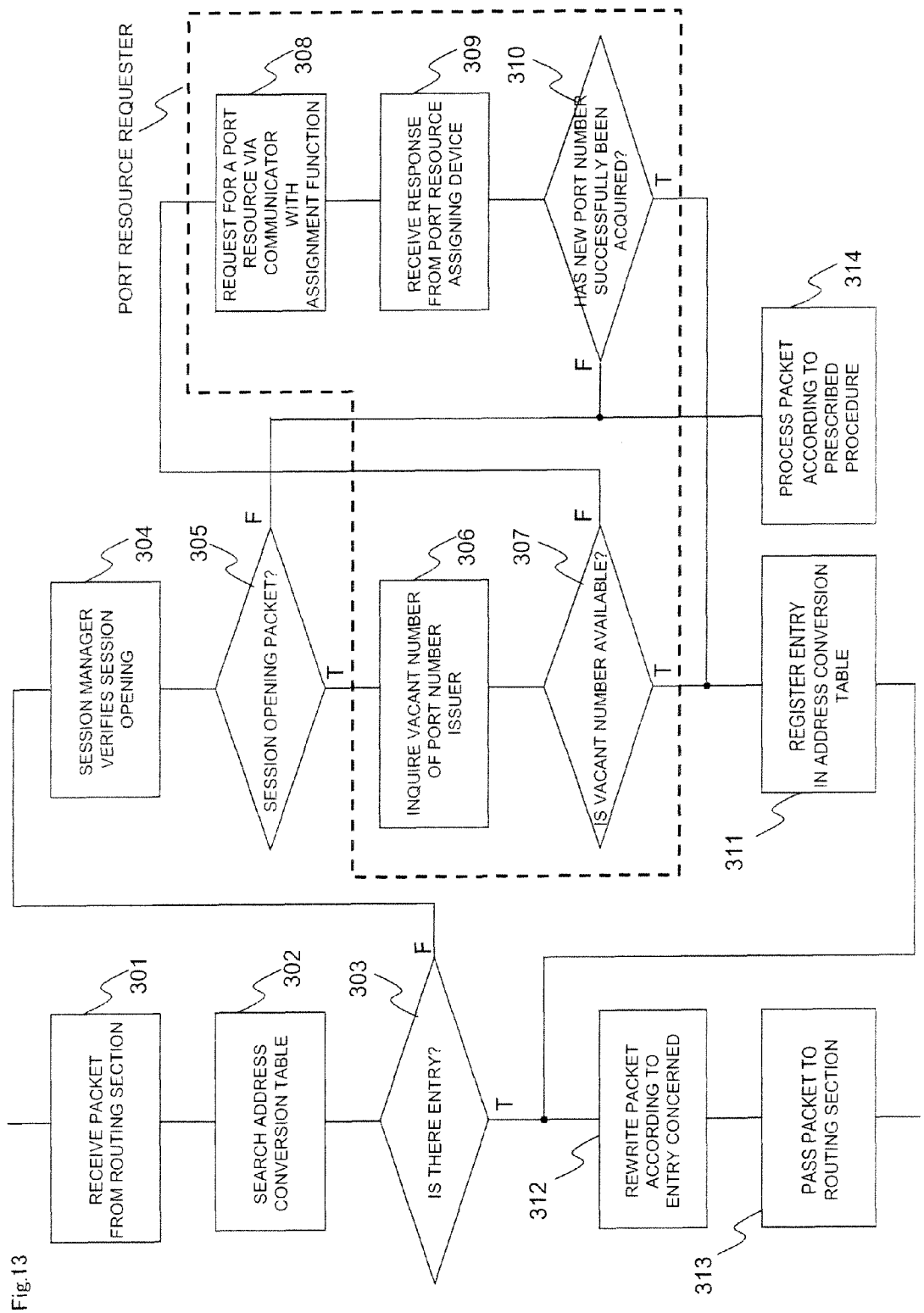
FIG. 13 is a flowchart for illustrating an example of a series of operations when a session performed by a NAPT node, or CPE, is started in the first exemplary embodiment.

FIG. 13 is a flowchart for illustrating an example of a series of operations when a session performed by the NAPT node, or CPE, is started in the first exemplary embodiment. A part of the operation encircled by broken lines in the operation shown in FIG. 13 is the operation of port resource requester 340, and the other is the operation of address converter 330.

The process for starting a session in the NAPT is driven by a session opening packet transmitted from the host node. Referring to FIG. 13 the packet received from the outside is passed to address converter 330 via routing section 310 in step 301.

Next, in step 302, address converter 330 searches address conversion table 331 on the basis of header information of the packet concerned. More specifically, if the packet is received from the private network, the entry of private terminal point is retrieved using the terminal point of the originator as a key. If the packet is received from the ISP side, the entry of the global terminal point is retrieved using the destination point as a key in step 303.

As a result of the search, if the entry is present, the packet belongs to the session having already been started, thereby negating the need of starting the session. In this case, in step 312, address converter 330 rewrites header information of the packet according to the address conversion entry; in step 313, passes the packet to routing section 310 and then completes the process.

On the other hand, if the entry is absent in step 303, session manager 332 verifies whether or not the packet indicates that a session is to be started in step 304. Although a specific verification rule is dependent on a protocol, an operation policy and the like, a packet including a SYN segment of TCP is typically a packet to start a session.

In step 305, it is determined whether or not the packet is the packet to start the session. If it is the packet that starts the session, address converter 330 inquires port resource requester 340 whether or not the acquired vacant port is present in order to acquire the port number required for the terminal point information of the address conversion entry on the global side in step 306. The operation subsequently performed in steps 306 to 310 is identical to the respective operation in steps 202 to 206.

In a case here the new port can be acquired in step 310 or a case where the CPE holds the vacant port in step 307, address converter 330 creates the terminal point using the port number concerned and IP address issued on opening the line in step 311, rewrites the header of the packet that starts the session using the entry in step 312, transmits the packet using routing section 310 in step 313 and completes the process.

On the other hand, in a case where the new port cannot be acquired in step 310 or a case where it is determined that the packet is not the packet that starts the session in step 305, the process on the packet cannot be continued. Therefore, the packet is processed according to a prescribed procedure in step 314. The processing procedure is dependent on a transport protocol and an operation policy. Typically, the packet is discarded, and an ICMP (Internet Control Message Protocol) unreachable error is transmitted to the originator.

1.2 Operation of the Port Resource Assigning Device and the Access Router

Figure 14:
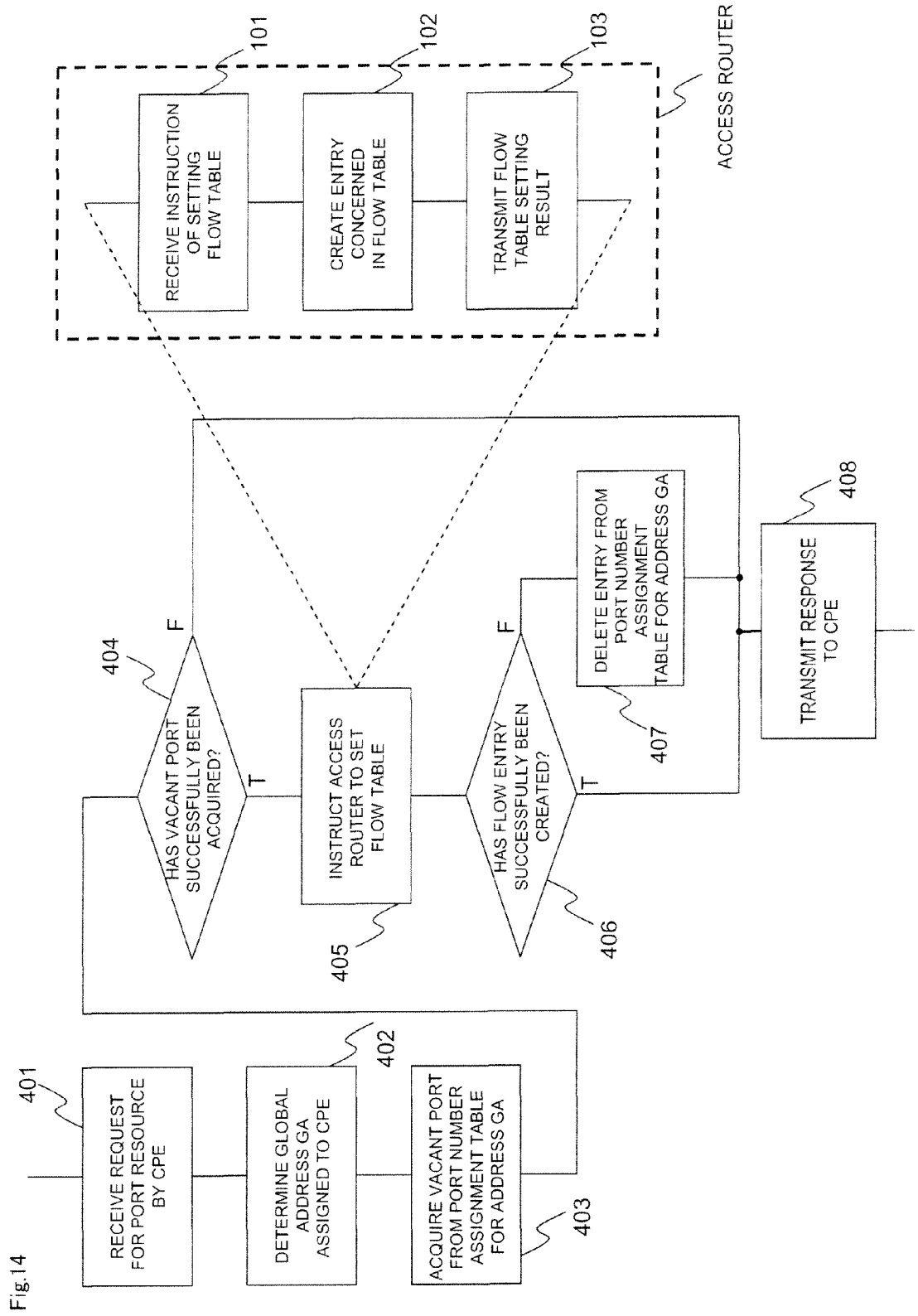
FIG. 14 is a flowchart for illustrating an example of an operation when a session is started between an access router and a port resource assigning device shown in FIG. 5 in the first exemplary embodiment.

FIG. 14 is a flowchart for illustrating an example of operation when a session is started between access router 100-1 and port resource assigning device 400 shown in FIG. 5 in the first exemplary embodiment. A part of the operation encircled by broken lines in the operation shown in FIG. 14 is the operation of port base routing section 120 of access router 100-1, and the other is the operation of port resource assigning device 400.

Session starting process according to the functions is driven in response to a request to assign a port resource by the CPE. Referring to FIG. 14, when the request to assign a port resource is reached in step 401, port resource assigning device 400 determines the global address to which a port is issued in step 402 on the basis of information of the CPE of the originator of the request. The global address determined here is GA.

Next, port resource assigning device 400 searches port resource assignment tables 410-1 to 410-n of GA for a vacant port number and determines the port number to be assigned in step 403.

It is determined whether or not the vacant port acquisition has succeeded in step 404. If the vacant port is available, port resource assigning device 400 transmits an instruction to access router 100-1 using the terminal point acquired based on address GA and the port concerned (this is regarded as GP) as a key so as to create the flow entry for transmitting a packet to the originator of the request CPE in step 405.

Port base routing section 120 of access router 100-1 receives the instruction in step 101, creates an entry in flow table 121 in step 102, and returns a setting result to port resource assigning device 400 in step 103.

Port resource assigning device 400 determines whether or not the received setting result has succeeded in step 406. If it is successful, a successful response is created and transmitted to the CPE together with the port number in step 408. If the received setting result is unsuccessful, the entry secured in step 403 is released in step 407 and an unsuccessful response is created and transmitted to the CPE in step 408.

If the acquisition of the vacant port is unsuccessful in step 404, port resource assigning device 400 creates the unsuccessful response and transmits this response to the CPE in step 408.

The above operation is specific to opening the session. Access router 100-1 is required for the process in which a packet starts a session according to the flow entry as with the other packets (operation corresponding to steps 9 and 10 in FIG. 10 and steps 29 and 30 in FIG. 11). The procedure thereof will hereinafter be described.

2. Operation on Packet Transfer

2.1 Operation of the Access Router

Figure 15:
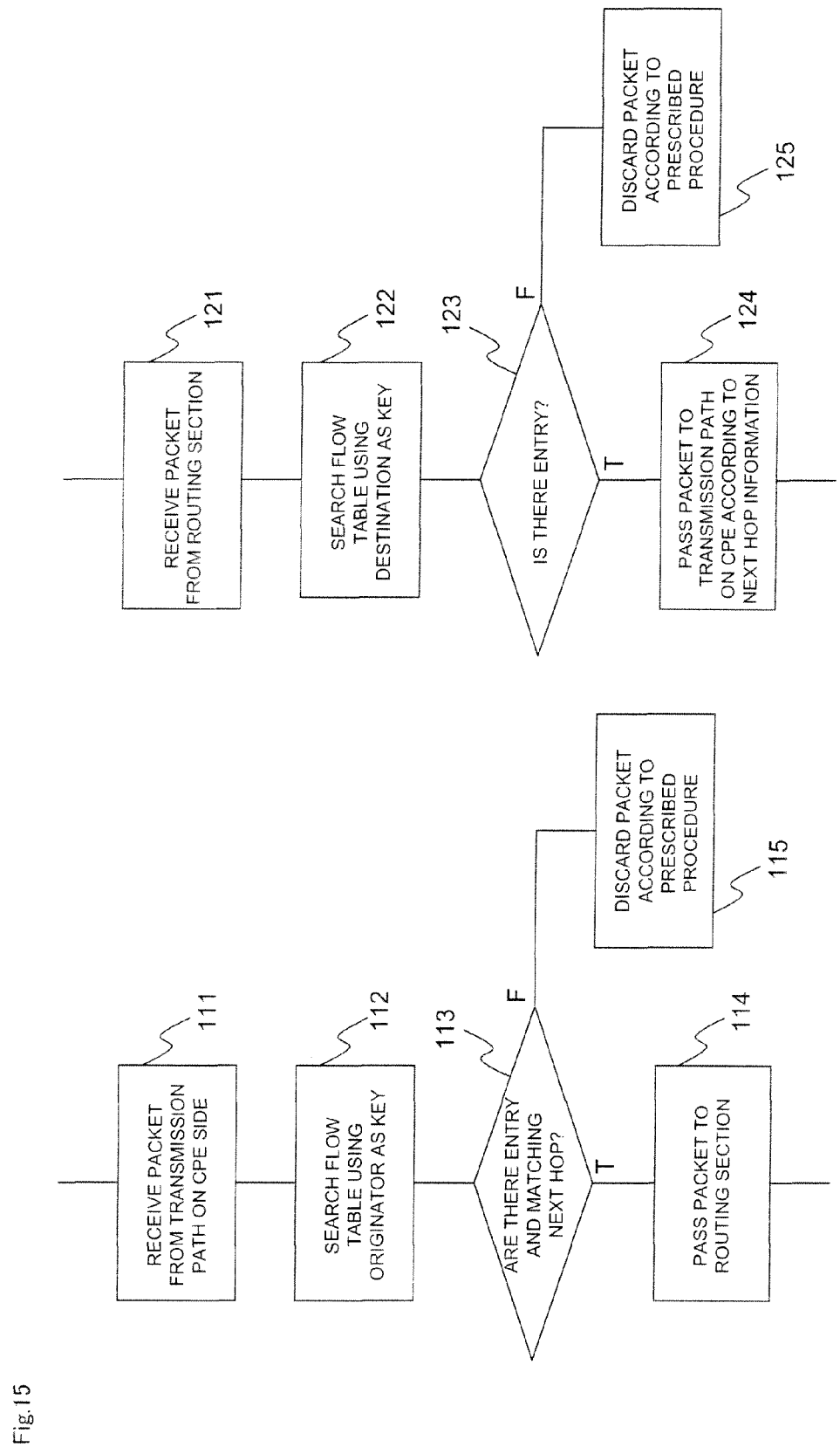
FIG. 15 is a flowchart for illustrating an example of an operation when a packet is transferred in a port base routing section of the access router shown in FIG. 5.

FIG. 15 is a flowchart for illustrating an example of an operation when the packet is transferred in port base routing section 120 of access router 100-1 shown in FIG. 5.

The left part of the flowchart shown in FIG. 15 represents processing of the packet received from the CPE side. The right part of the flowchart represents processing of the packet received from the ISP side. Packet transfer processing other than that of port base routing section 120 is identical to a typical router.

When the packet is received from the CPE in step 111, the flow entry is searched for by using the terminal point of the originator of the packet as a key in step 112. If the entry has been found, the transmission path through which the packet has been received and next hop information are compared with each other. As a result of this comparison, it is determined whether or not the packet has been received through the transmission path identical to the next hop in step 113. If it has been received therethrough, the packet is passed to routing section 110 for distribution in step 114.

If the flow entry has not been found, the CPE is to transmit a packet that uses an unassigned port number. Instead, if the packet has been received through the transmission path different from that of the next hop next of the flow entry, a port number assigned to another CPE is used. In these cases, in step 115, the packet is passed to unassigned port communication blocker 130 and prescribed processing is performed. The details of processing are dependent on the transport protocol and the operation policy. Typically, the packet is discarded, an ICMP error is transmitted to the originator, and information of the packet is recorded in a system log.

Next, when the packet is received from the ISP side, the packet is passed from routing section 110 in step 121. The flow entry is searched for by using the received terminal point of the destination of the packet as a key in step 122. It is determined whether the entry is present or absent in step 123. If the entry has been found, the destination of distribution is determined from the next hop information of the found entry and then the packet is transmitted to the transmission path concerned in step 124.

On the other hand, if the flow entry has not been found, the packet is a packet belonging to a session having already been completed or a packet of an unestablished session. Accordingly, the packet is processed according to a prescribed procedure in step 125. Typically, the packet is discarded, and an ICMP unreachable error is transmitted to the originator.

3. Operation when the Session is Completed

The operation when the session is completed will be described for each device.

3.1 Operation of the CPE

3.1.1 Operation in the Case of the CPE is the Host Node

Figure 16:
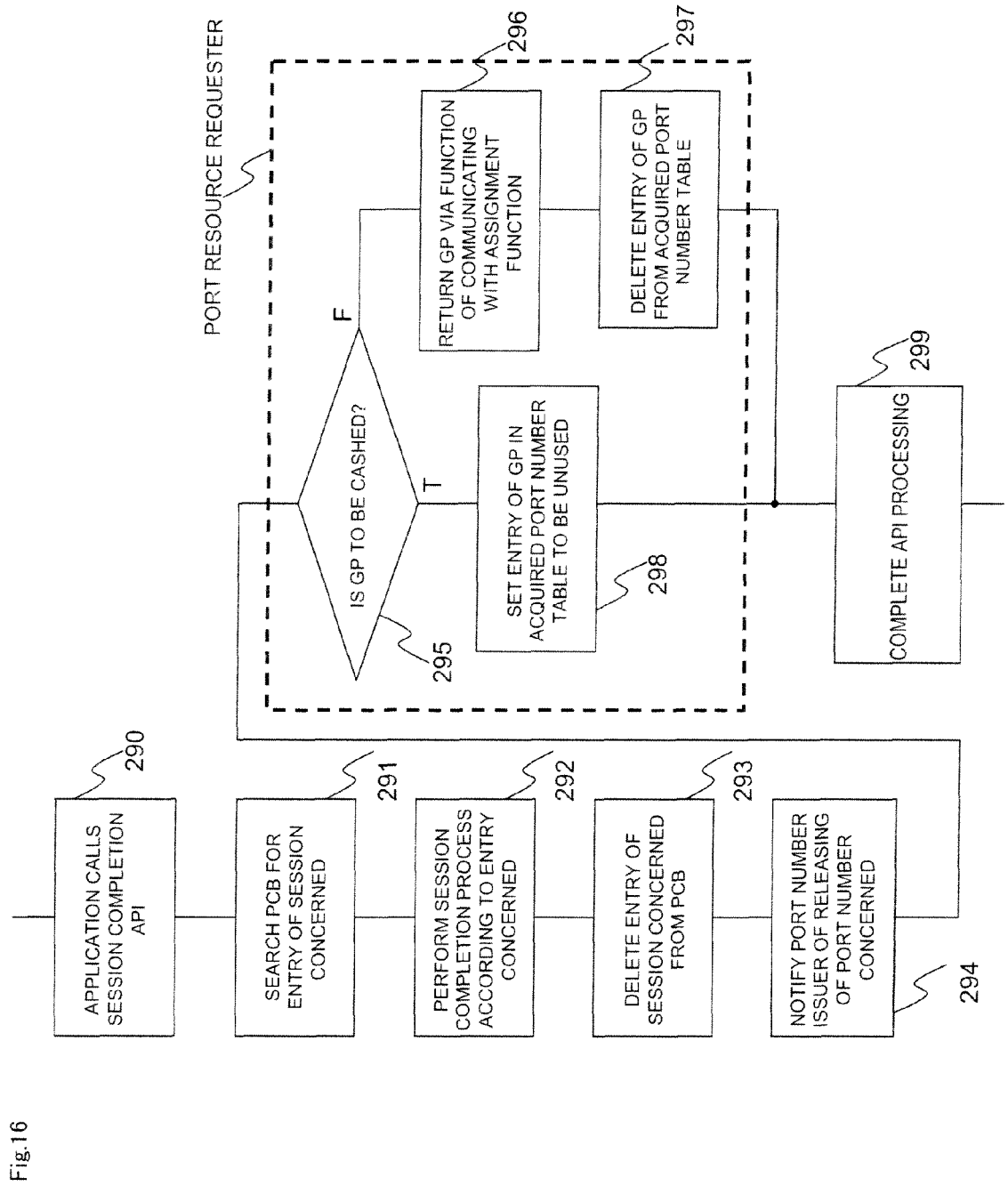
FIG. 16 is a flowchart for illustrating an example of an operation when the session of the host node, or CPE, is completed in the first exemplary embodiment.

FIG. 16 is a flowchart for illustrating an example of an operation when the session of the host node, or CPE, is completed in the first exemplary embodiment. The part of operation encircled by broken lines in the operation shown in FIG. 16 is the operation of port resource requester 240, and the other is operation of transport layer terminator 210.

The session completion processing is driven by the host node of the own site in one case, or driven from the side of the opposite party of communication in the other case. Here, for the sake of simplicity, description is made only on the case where the session is completed from the own site side. Note that, also in the case where the session is completed from the side of the opposite party of communication, only the first step is generally different but the other steps can be realized in an analogous manner.

First, in step 290, application 230 calls a session completion API. For example, in Barkley socket API, this corresponds to "close", "shutdown" and the like. Transport layer terminator 210 searches PCB 211 using the session identifier passed through this API as a key in step 291.

If the entry is found, session completion processing is performed according to the state of the entry in step 292. In the TCP, a series of operations from an ESTABLISHED state to a CLOSED state is applied. After completion of the processing, transport layer terminator 210 deletes the entry concerned from PCB 211 in step 293.

Next, in step 294, it is notified to port number issuer 242 that the port concerned has been released. Port number issuer 242 determines whether to hold the port number concerned in an unused state in the own CPE or to return this number to port resource assigning device 400 in step 295.

If the port number is held, the entry concerned in acquired port number table 241 is set to an unused state in step 298 and then the API processing is completed in step 299.

On the other hand, if the port number is to be returned, the return is notified to port resource assigning device 400 in step 296, the entry concerned in acquired port number table 241 is deleted in step 297 and then the API processing is completed in step 299.

3.1.2 Operation in the Case where the CPE is the NAPT

Figure 17:
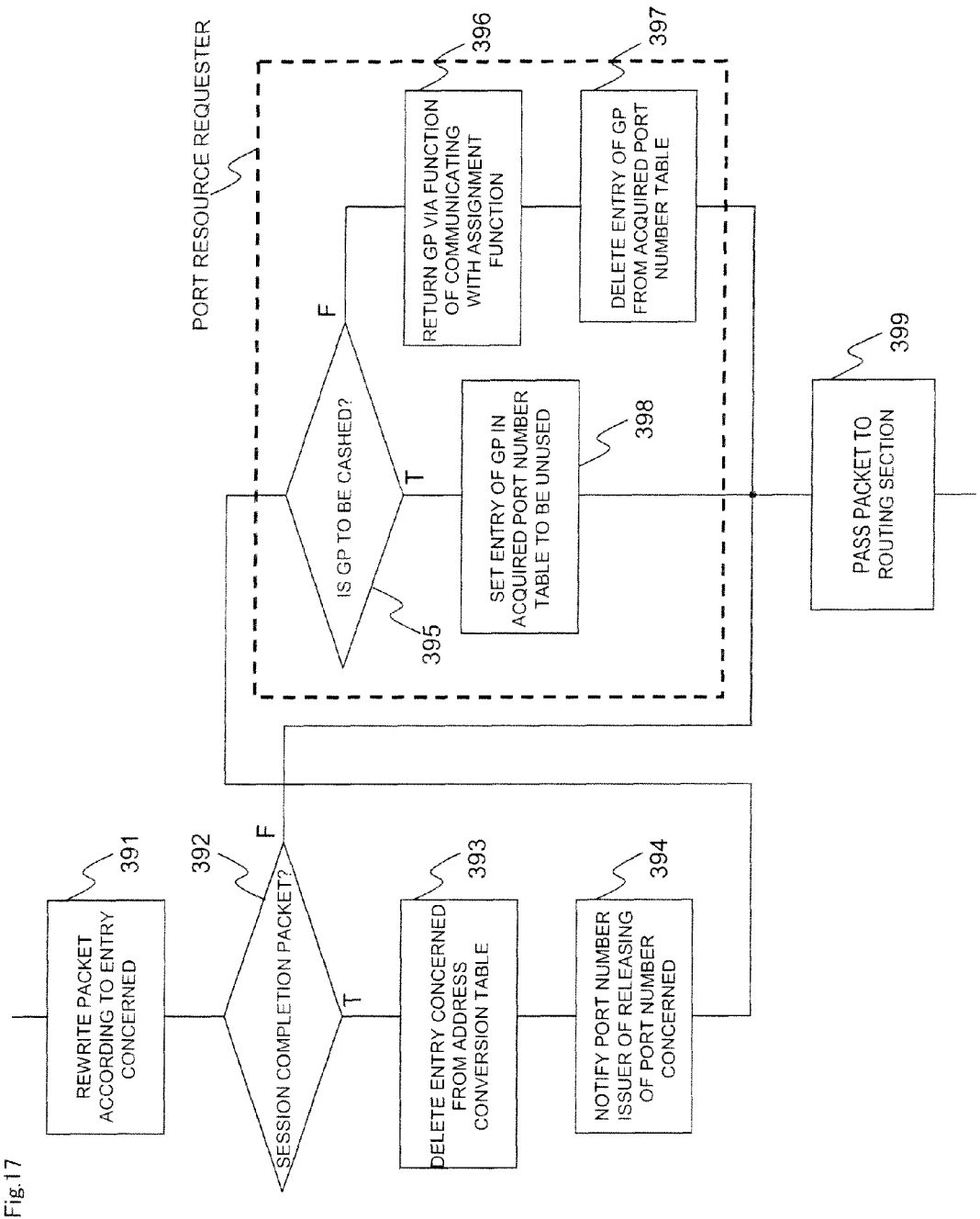
FIG. 17 a flowchart for illustrating an example of an operation when the session of the NAPT node, or CPE, is completed in the first exemplary embodiment.

FIG. 17 is a flowchart for illustrating an example of an operation when the session of the NAPT node, or CPE, is completed in the first exemplary embodiment. A part of the operation encircled by broken lines in the operation shown in FIG. 17 is the operation of port resource requester 340, and the other is the operation of address converter 330.

In the NAPT, session completion processing is driven by a session completion packet in one case or by a timer in the other case. For the sake of simplicity, description is made only on the former case. Also in the case of performing session completion processing by the timer, only the beginning two steps are different but the other steps can be realized in an analogous manner.

When address converter 330 receives the packet from routing section 310, address converter 330 searches for the address conversion entry according to a typical procedure. If the entry is found, address converter 330 rewrites the header information of the packet in step 391.

Next, address converter 330 verifies whether or not the packet concerned indicates a session completion in step 392. For example, in the TCP, this is, after an ACK for a FIN segment has passed, an ACK packet for a FIN segment received from the opposite side. If this is the session completion packet, the entry concerned is deleted from address conversion table 331 in step 393.

Next, address converter 330 notifies port number issuer 242 of port resource requester 340 that the port concerned has been released, in step 394. Processing of steps 394 to 398 to be subsequently performed is identical to that of respective steps 294 to 298 in FIG. 16.

At last, address converter 330 passes the rewritten packet to routing section 310 in step 399, and completes the processing.

3.2 Operation of the Port Resource Assigning Device and the Access Router

Figure 18:
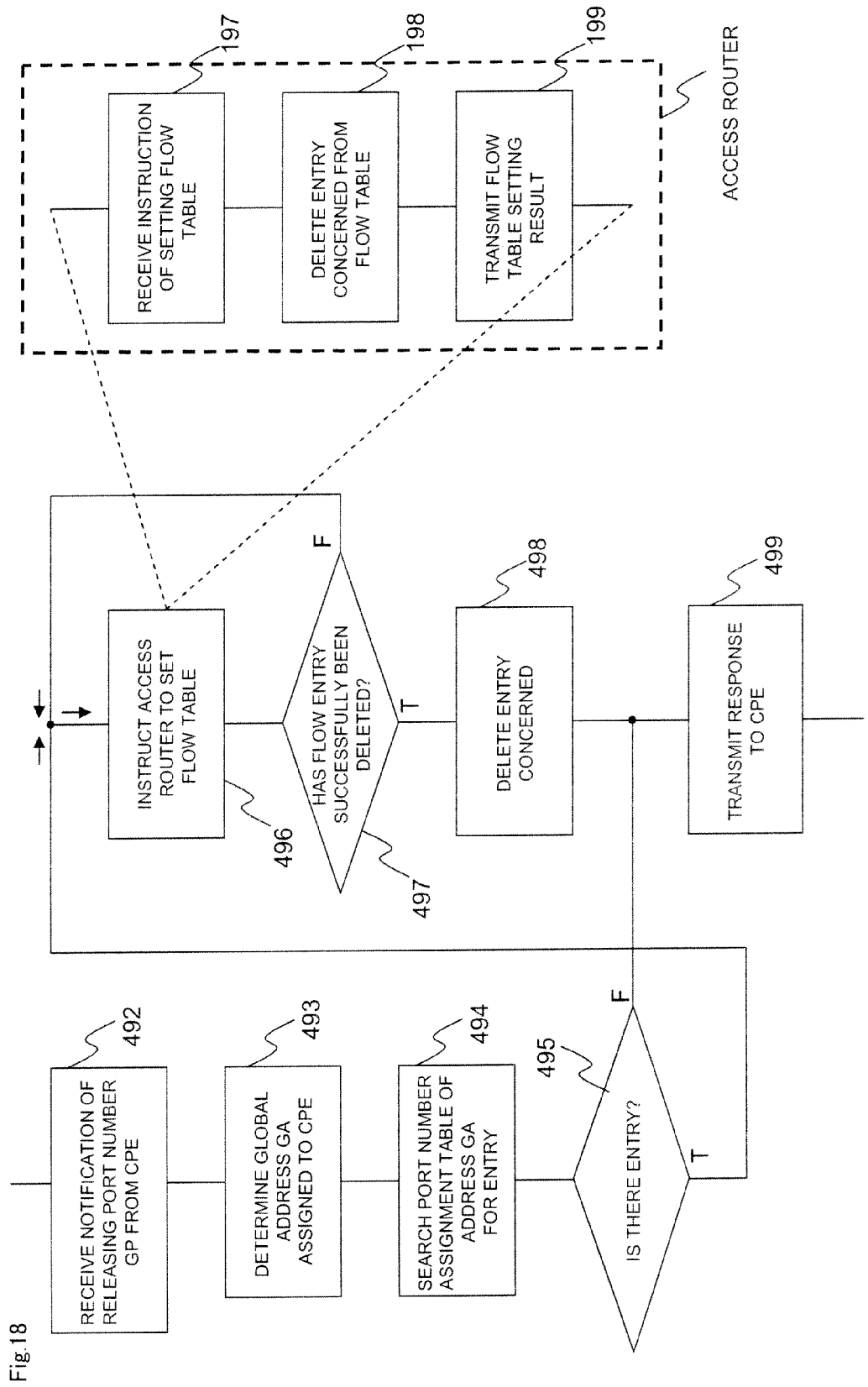
FIG. 18 is a flowchart for illustrating an example of an operation when the session of the access router and the port resource assigning device shown in FIG. 5 is completed in the first exemplary embodiment.

FIG. 18 is a flowchart for illustrating an example of an operation when the session of access router 100-1 and port resource assigning device 400 shown in FIG. 5 is completed in the first exemplary embodiment. A part of the operation encircled by the broken lines shown in FIG. 18 is the operation of port base routing section 120 of access router 100-1, and the other is the operation of port resource assigning device 400.

Session completion processing according to the above function is driven by a notification of releasing a port resource from the CPE. Referring to FIG. 18, when the notification of releasing the port resource in step 492 is received, port resource assigning device 400 determines the global address of a resource whose port is to be released on the basis of the information of the CPE of the originator of the request in step 493. The global address determined here is GA.

Next, port resource assigning device 400 searches port resource assignment tables 410-1 to 410-$n$ of GA for the entry concerned in step 494.

In step 495, it is determined whether the entry is present or absent. If the entry is present, port resource assigning device 400 transmits an instruction to access router 100-1 so as to delete the flow entry for distributing the packet to the originator of the request CPE using the terminal point acquired based on the address GA and the port concerned (which is regarded as GP) as a key in step 496.

Port base routing section 120 of access router 100-1 receives the instruction in step 197, deletes the entry in flow table 121 in step 198 and then returns the setting result to port resource assigning device 400 in step 199.

Port resource assigning device 400 determines whether or not the received setting result is successful in step 497. If it is successful, port resource assigning device 400 deletes the entry of port resource assignment tables 410-1 to 410-$n$ in step 498, creates a successful response in step 499 and transmits the response to the CPE that originated the notification.

If the received setting result is unsuccessful, port resource assigning device 400 performs the processing of step 496 again. An upper limit value for the repeating is set. When the number of repeating reaches the upper limit value, port resource assigning device 400 performs the processing of step 498 and stores a record of the entry concerned in the system log.

If the entry is absent in step 495, port resource assigning device 400 returns an error to the CPE of the originator in step 499.

4. Operation in a Case of a Router where the CPE does not Include the NAPT Function Next, a case where the CPE is a router and does not have the NAPT function will be described. In this case, there is a possibility where the CPE is connected with subordinate host nodes that have global addresses. Since these host nodes are not CPE, the port number of the originator cannot be controlled from port resource assigning device 400.

Accordingly, the IP address assigned to this CPE cannot be shared with another CPE by dividing the port number space. Therefore, in a case where the CPE is a router without the NAPT function, an operation is performed such that the CPE concerned exclusively uses the IP address assigned by the ISP, as with a typical CPE.

Access router 100-1 does not cause port base routing section 120 to process the packet reached from the CPE concerned but to determine distribution method by only a typical routing function.

Since such a CPE reduces usage efficiency of the IP address, following implementation may be considered.

(1) A high connection fee is set in comparison with a case of CPE sharing an IP address.

(2) CGNAT accommodates CPE as subordinate parties. However, in this case, if the number of pieces of CPE concerned is high, the advantageous effect of the present invention is reduced. Accordingly, this alternative may be performed together with (1).

Another Additional Supplementary Function

In order to improve convenience, the following supplementary function may be provided.

Limitation on the Number of Port Numbers to be Assigned

Port resource assigning device 400 may set an upper limit of the number of port numbers assigned to individual users and individual CPE. This can prevent a single user from exclusively using a lot of port numbers.

If port assignment to CPE reaches the upper limit, a process of acquiring a port is configured such that vacant port acquisition fails in step 404 in FIG. 14, thereby allowing the above configuration to be realized.

Alternative of Configuration

If there is CPE that cannot be mounted with port resource requester 240 or 340, a connection service in units of IP addresses may be provided in a manner analogous to that of a typical IP address connection service as with the case of the router without the aforementioned NAPT function. This allows CPE and the like incapable of updating firmware to be continuously used.

Port resource assigning device 400 may assign port numbers in response to a request to assign one port number. This negates the need to issue a request to assign a port number every time a session is started. Accordingly, the overhead of starting a session can be reduced.

Description has been made separating port resource assigning device 400 and access router 100-1 from each other in order to distinguish the control and transmission functions. However, the function included in port resource assigning device 400 may be implemented in access router 100-1.

Further, description has been made in which the function of port base routing section 120 of access router 100-1 is different from that of typical routing section 110. However, from the standpoint of implementation, these may be realized as a single program or as a single piece of hardware. Since flow table 121 is a superset of a routing table, the function of the routing table can be realized by searching the flow entry without a port number.

Second Exemplary Embodiment

A Case where CPE Uses Assignment Port in Sessions

In the first exemplary embodiment, the CPE uses one port for one session. However, in a case where the opposite party of communication is different, a single terminal point on the local side may be used for a different connection destination. This configuration allows the port number to be used more efficiently.

The description will be made on points different from those of the first exemplary embodiment. In a second exemplary embodiment, only the CPE, or NAPT, has a configuration different from that of the first exemplary embodiment.

Figure 19:
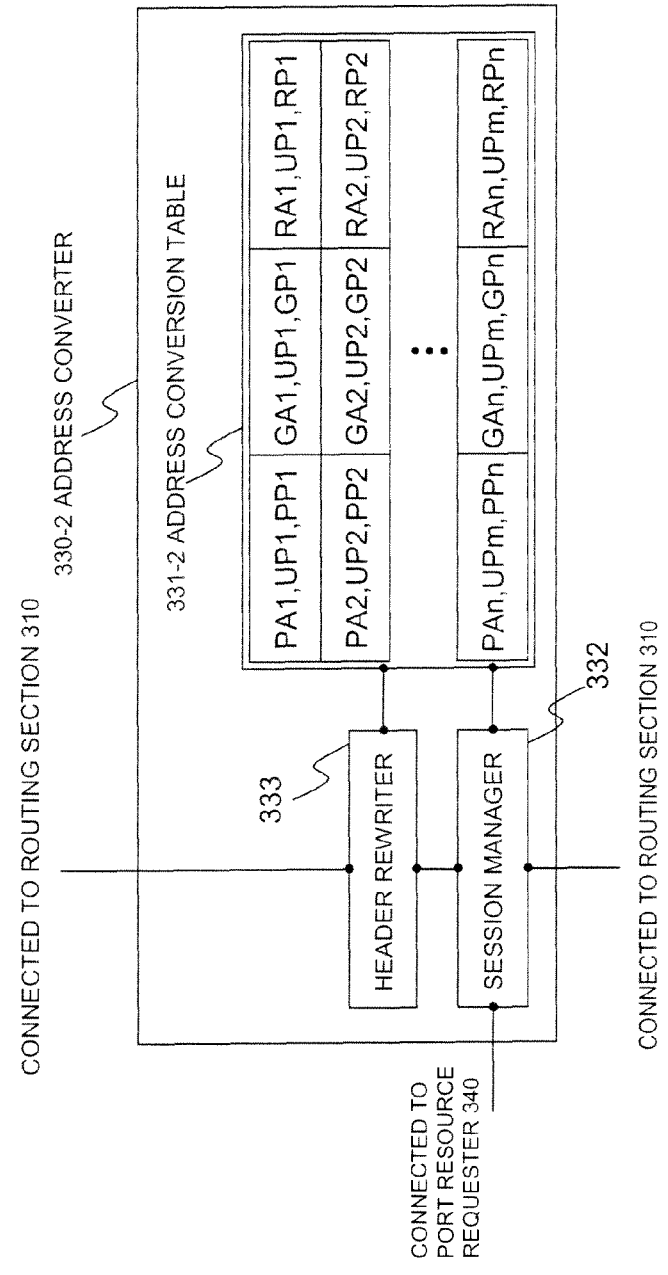
FIG. 19 is a block diagram showing an example of an internal configuration of an address converter in a second exemplary embodiment.

FIG. 19 is a block diagram showing an example of an internal configuration of address converter 330-2 in the second exemplary embodiment. Address converter 330-2 is provided in the CPE, or NAPT, as with address converter 330 in the first exemplary embodiment.

Among configurational elements of address converter 330-2 shown in FIG. 19, the configuration of address conversion table 331-2 is different from that of the first exemplary embodiment. A typical address conversion table holds a set of terminal point (PAn and PPn) held by the host node, and terminal point (GAn and GPn) reassigned by the NAPT node. Additionally, address conversion table 331-2 of the second exemplary embodiment holds terminal point (RAn and RPn) of the opposite node. A typical address conversion entry is retrieved using only the destination of a packet or the terminal point of the originator as a key. Address conversion table 331-2 in the second exemplary embodiment is required to be searched using terminal points of both the destination and the originator.

The configurations of the other functions are identical to those of the first exemplary embodiment.

Description will be made of a part of the operation different from that of the first exemplary embodiment. As to the operation, the second exemplary embodiment is different only as regards the CPE from the first exemplary embodiment.

1. Operation when a Session is Opened

1.1 Operation of the CPE

1.1.1 Operation in a Case where the CPE is the Host Node

In the first exemplary embodiment, the process for starting the session in the case where the CPE is the host node has been described using FIG. 12. Referring to this diagram, description will be made only on the part different from that of the first exemplary embodiment.

First, as with the first exemplary embodiment, in step 201, the application calls the session open API and drives the process for starting the session. Next, an attempt is made to secure a port number for the terminal point of the own host. Subsequent processing will be described using a flowchart.

Figure 20:
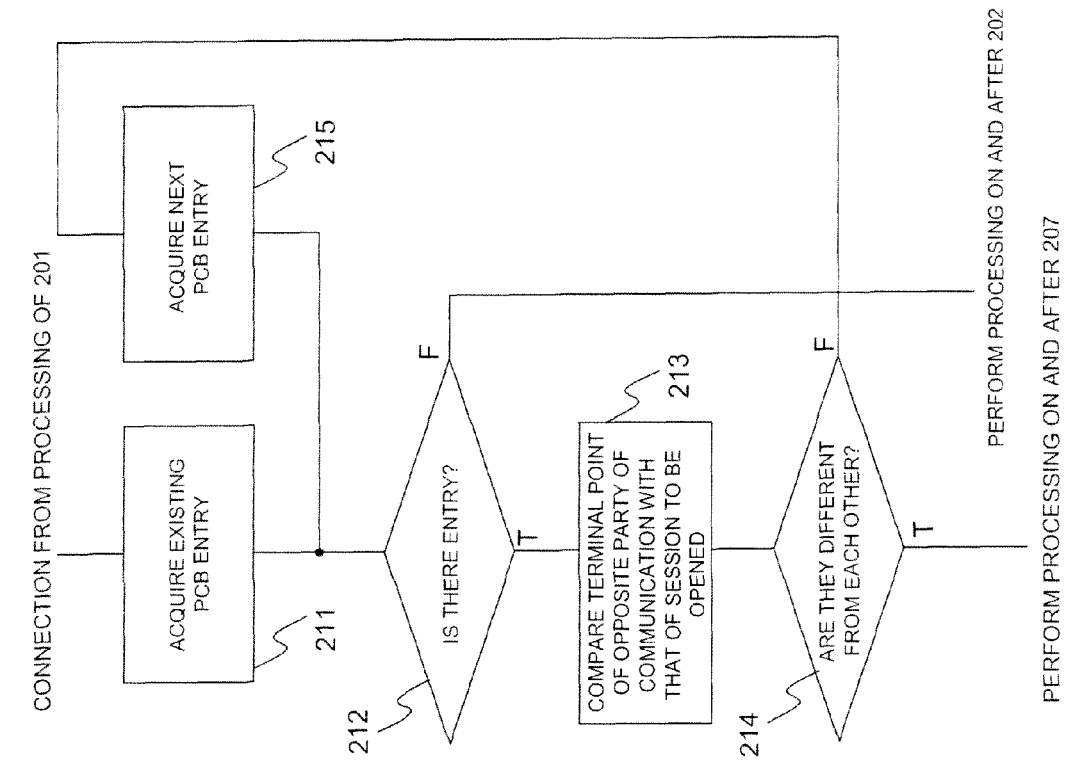
FIG. 20 is a flowchart showing an example of an operation when a session of a host node, or CPE, is started in the second exemplary embodiment.

FIG. 20 is a flowchart showing an example of an operation when a session of a host node, or CPE, is started in the second exemplary embodiment.

Referring to FIG. 20, in the second exemplary embodiment, in step 211, transport layer terminator 210 sequentially picks up existing entries from the existing PCB. In step 212, it is determined whether the entry is present or absent. If the entry is present, the terminal point of the opposite party of communication is then verified in step 213 and it is determined whether or not the session is identical to that to be opened in step 214.

If the session is different, transport layer terminator 210 creates a PCB entry using the same port number. Since the terminal point of the opposite party of communication is different, these entries can be identified as different entries. The operation of creating the PCB entry is analogous to that of step 207 in FIG. 12.

On the other hand, if the session is identical, transport layer terminator 210 verifies the next entry in step 215.

Instead, if no entry or no port number can be used without redundancy, transport layer terminator 210 or port resource requester 240 performs processing of and after step 202 in FIG. 12.

With such a configuration, as long as the terminal point of the opposite party of communication is different, the same port number can be used on the local side. Accordingly, acquisition of a new port number can be suppressed.

1.1.2 Operation in a Case where the CPE is the NAPT Node

In the first exemplary embodiment, the process for starting the session in the case where the CPE is the NAPT node has been described using FIG. 13. Referring to FIG. 13, description will be made only on a part different from that of the first exemplary embodiment.

The processing of steps 301 to 305 described using FIG. 13 is analogous to that of the first exemplary embodiment. New processing is additionally inserted after True branch of step 305 and before step 306 described using FIG. 13. The inserted processing will be described using a flowchart.

Figure 21:
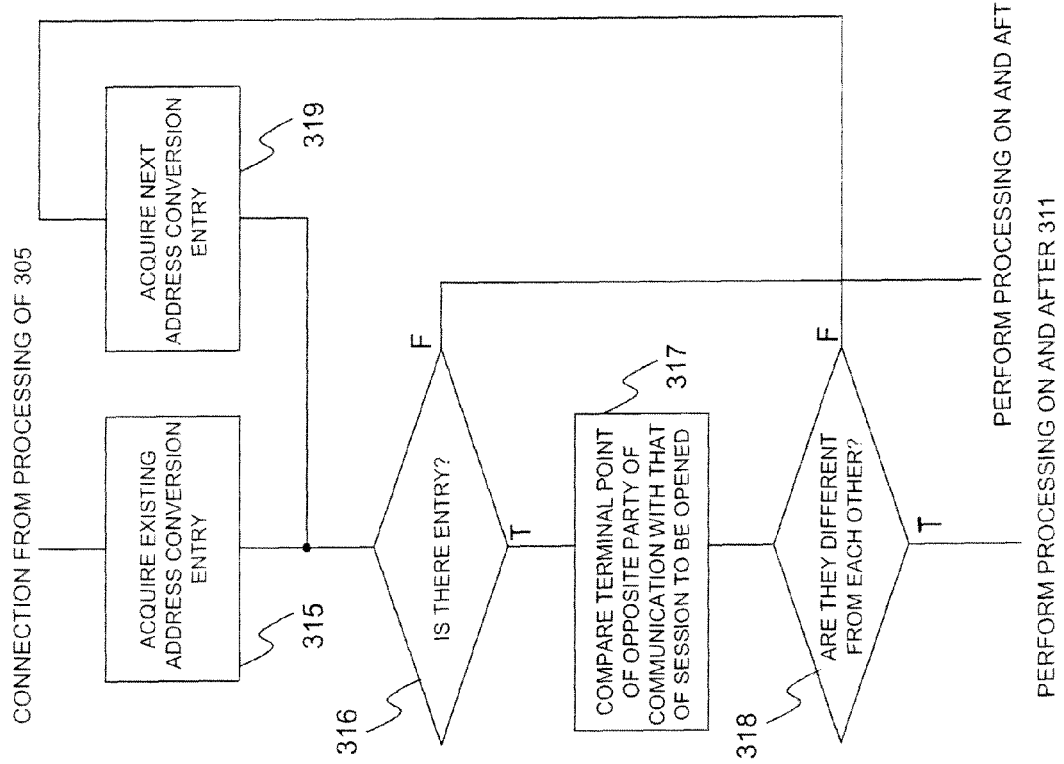
FIG. 21 is a flowchart showing an example of an operation when a session of a NAPT node, or CPE, is started in the second exemplary embodiment.

FIG. 21 is a flowchart showing an example of an operation when a session of a NAPT node, or CPE, is started in the second exemplary embodiment.

Referring to FIG. 21, in the second exemplary embodiment, address converter 330-2 sequentially picks up existing entries from the existing address conversion table in step 315. In step 316, it is determined whether the entry is present or absent. If the entry is present, address converter 330-2 then compares the terminal point of the opposite party of communication of the entry concerned and the destination terminal point of the packet that starts the session with each other in step 317 and determines whether the points are identical or not.

If different, address converter 330-2 creates an address conversion entry using the identical global port number. Since the terminal point of the opposite party of communication is different, these entries can be identified as different entries. The processing of creating address conversion entries is identical to that of step 311 in FIG. 13.

If identical, address converter 330-2 verifies the next entry in step 319.

However, if no entry or no port number can be used without redundancy, port resource requester 340 or address converter 330-2 performs processing of and after step 306 in FIG. 13.

With such a configuration, as long as the terminal point of the opposite party of communication is different, the same port number can continuously be used on the global port. Accordingly, acquisition of a new port number can be suppressed.

2. Operation on Packet Transfer

2.1 Operation of the Access Router

Access router 100-1 performs the operation identical to that of the first exemplary embodiment. Access router 100-1 transmits the packet on the basis of the terminal point on the CPE side. Accordingly, even if the CPE establishes the opposite parties of communication using the single port number, this does not adversely affect access router 100-1.

3. Operation when the Session is Completed

3.1 Operation of the CPE

3.1.1 Operation in the Case where the CPE is the Host Node

In the first exemplary embodiment, the session completion process in the case where the CPE is the host node has been described using FIG. 16. Referring to FIG. 16, description will be made only on a part different from that of the first exemplary embodiment.

In this exemplary embodiment, the port number on the local side is shared among sessions whose terminal points of the opposite parties of communication are different from each other. Accordingly, even when any one of the sessions is completed, there is a possibility that another session is using the same port number. Therefore, the following processing is additionally inserted between steps 293 and 294 shown in FIG. 16.

Transport layer terminator 210 searches PCB 211 using the terminal point on the local side of the completed session as a key and verifies whether the entry using the same port number is present or absent.

If the entry is present, transport layer terminator 210 or port resource requester 240 does not perform the process of releasing the port number on and after step 294 but performs step 299 and completes the API process.

If the entry concerned is absent, the session using the port number will have become absent. Accordingly, transport layer terminator 210 or port resource requester 240 subsequently performs processing after step 294.

3.1.2 Operation in the Case where the CPE is the NAPT

In the first exemplary embodiment, the process for starting the session in the case where the CPE is the host node has been described using FIG. 17. Referring to FIG. 17, description will be made only on a part different from that of the first exemplary embodiment.

In a case where the CPE is the NAPT node, as with the case where the CPE is the host node, address converter 330-2 deletes the address conversion entry in step 393 and subsequently verifies the presence or absence of the entry that uses the global port on the same local side.

If the entry using the port number concerned is present, address converter 330-2 performs step 399. On the other hand, if the entry using the port number concerned is absent, address converter 330-2 subsequently performs step 394.

Example

The exemplary embodiments of the present invention can be specifically realized using following devices.

That is any one of pieces of CPE 200-1, 200-2, 300-1 and 300-2, access routers 100-1 and 100-2, port resource assigning device 400 includes a central processing unit (CPU), volatile memory, communication interface, and nonvolatile memory or hard disk. The above operation can be realized by a program stored in the nonvolatile memory or the hard disk, or a program to be loaded after activation using communication interface.

Each of access routers 100-1 and 100-2 can be realized not only as a single computer but also as a so-called chassis type device, which includes a line card mounted with a communication interface, a CPU card performing control of the entire device and path calculation, a switch fabric module exchanging packets between the cards at high speed, and a service card mounted with another supplementary function. In this case, the routing section, the port base routing section and the like may also be realized as the line card and the service card of the above device.

Further, access routers 100-1 and 100-2 and port resource assigning device 400 can be sufficiently realized using, for example, a communication system and communication device described in the literature, "Nick McKeown et al, 'OpenFlow: Enabling Innovation in Campus Networks,' ACM SIGCOMM Computer Communication Review, Vol 38, No 2, April 2008".

Port resource requesters 240 and 340 can be realized not only as independent devices but also as programs operating in access routers 100-1 and 100-2.

CPE 200-1, 200-2, 300-1 and 300-2 may be realized not only as a dedicated device but also as a program operating together with another program on a general-purpose computer such as a personal computer.

In other words, processing of CPE 200-1, 200-2, 300-1 and 300-2, access routers 100-1 and 100-2, port resource assigning device 400 described in the first and second exemplary embodiments may be performed by logic circuits manufactured according to purposes. Programs including processing details written as procedures may be recorded in a recording medium readable by CPE 200-1, 200-2, 300-1 and 300-2, access routers 100-1 and 100-2 and port resource assigning device 400, the programs may be read by CPE 200-1, 200-2, 300-1 and 300-2, access routers 100-1 and 100-2, port resource assigning device 400 and then performed. The recording medium readable by CPE 200-1, 200-2, 300-1 and 300-2, access routers 100-1 and 100-2 and port resource assigning device 400 may be not only a movable recording medium, such as a floppy disk (registered trademark), a magneto-optical disk, a DVD and a CD, but also a memory, such as a ROM and a RAM and a HDD included in CPE 200-1, 200-2, 300-1 and 300-2, access routers 100-1 and 100-2 and port resource assigning device 400. The programs recorded in the recording medium may be read into CPUs (not shown) in CPE 200-1, 200-2, 300-1 and 300-2, access routers 100-1 and 100-2 and port resource assigning device 400, and processing analogous to that described above may be performed under control of the CPUs. Here, the CPU functions as a computer for performing the program read from the recording medium recorded with the program.

As described above, in the present invention, the port number space is divided for the addresses assigned to the respective access routers. Accordingly, the router nearer the Internet than the access router can be path-controlled using only the IP address. This allows address sharing to be realized without using a device such as the border router that integrates traffic. Accordingly, a device such as a border router that integrates traffic is not adversely affected by address sharing.

Since the user who does not use the NAPT device can control the value of the local port number by the CPE connected to the ISP, the port number can be restricted within a certain assignment extent without port number conversion. This negates the need for using the port number converting device. That is, in a case in which originally there was no need, address sharing can be realized without converting the address and the port number on the ISP side.

Further, when communication is started, the CPE requests the port number as necessary. Accordingly, the port number for sharing the address can dynamically be issued. This allows use of the port number to be suppressed in a period without communication in comparison with a case of preliminarily assigning the port number by a DHCP and the like, enabling the port number to be used efficiently.

The present invention can be applied to a computer used by a user using an Internet connection service, a communication device installed by the user, and a router and the like installed by the ISP that accommodates them. In particular, the present invention can effectively be used in an environment with need to save the IP address.

Although the invention of the application has been described with reference to the exemplary embodiments, the invention of the application is not limited to the exemplary embodiments. Various modifications that can be understood by a person skilled in the art may be made to the configurations and details of the invention of the application without departing from the scope of the invention of the present application.

This application claims the benefits of priority based on Japanese patent application No. 2009-099853, filed on Apr. 16, 2009, the disclosure of which is incorporated herein by reference in its entirety.

The invention claimed is:

1. An address-sharing system, comprising:
an access router that connects to a global network allowing mutual access using only an Internet Protocol (IP) address and a network other than the global network, and performs packet transfer between the global network and the network other than the global network using an address and a port number;
a port resource assigning device that manages the port number in a unit of the IP address and, when the packet transfer is performed between the global network and the network other than the global network, assigns the port number managed by the IP address preliminarily provided for the access router,
wherein the access router performs the packet transfer using the IP address preliminarily provided for the access router and the port number assigned by the port resource assigning device; and
a connection device that connects the global network and the network other than the global network,
wherein the access router performs the packet transfer via the connection device, and
wherein the connection device, when a communication session for the packet transfer is started, requests the port resource assigning device to assign the port number, and sets, for the connection device, a packet transfer path having the port number assigned to the access router by the port resource assigning device.

2. The address-sharing system, according to claim 1, wherein the connection device, in a case of having a Network Address and Port Translator (NAPT) function, performs control that rewrites the port number included in a header of the packet into a private port number usable in the network other than the global network, and, in a case of not having the NAPT function, controls the port number to be used by the connection device.

3. The address-sharing system, according to claim 1, wherein the port resource assigning device controls the number of port numbers to be assigned to each user.

4. The address-sharing system, according to claim 1, wherein the port resource assigning device, when requested to assign the port number by the connection device, assigns a plurality of port numbers.

5. The address-sharing system, according to claim 1, wherein the connection device uses the port number assigned to the connection device for a different communication session.

6. A port resource assigning device comprising:
a processor configured to:
manage and assign port number and Internet Protocol addresses for routing packets between a global network and a network other than the global network based upon a preliminarily provided Internet Protocol (IP) address for sake of packet transfer, when transferring a packet between the global network and the network other than the global network which results in providing access to the global network and the network other than the global network; and
wherein a connection device, when a communication session for the packet transfer is started, requests the processor to assign the port number, and sets, for the connection device, a packet transfer path having the port number assigned to the access router by the port resource assigning device, the connection device connects the global network and the network other than the global network, and an access router performs the packet transfer via the connection device, and
when requested to assign the port number by the connection device, the processor assigns a plurality of port numbers.

7. A connection device connected to a global network allowing mutual access using only an Internet Protocol (IP) address and a network other than the global network, and performing packet transfer between the global network and the network other than the global network using an address and a port number, the connection device comprising:
a processor configured to:
in a case of having a Network Address and Port Translator (NAPT) function, performing a control that rewrites the port number included in a header of the packet and that is to be used in the global network into a private port number usable in the network other than the global network, and, in a case of not having the NAPT function, controls the port number to be used by the connection device;
connects the global network and the network other than the global network,
wherein an access router performs the packet transfer via the connection device; and
when a communication session for the packet transfer is started, requests the port resource assigning device to assign the port number, and sets, for the connection device, a packet transfer path having the port number assigned to the access router by the port resource assigning device.

8. An address-sharing method in an address-sharing system including an access router performing packet transfer and a port resource assigning device assigning a port number to be used for the packet transfer, the address-sharing method comprising:
managing, by the port resource assigning device, the port number in a unit of the IP address;
assigning by the port resource assigning device, when performing the packet transfer between a global network allowing mutual access using only the Internet Protocol (IP) address and a network other than the global network, the access router with the port number managed of the IP address preliminarily provided for the access router;
performing, by the access router, the packet transfer using the IP address preliminarily provided for the access router and the port number assigned by the port resource assigning device;
performing, by the access router, the packet transfer via a connection device connecting the global network and the network other than the global network;
requesting by the connection device, when a communication session for the packet transfer is started, the port resource assigning device to assign the port number; and
setting by the connection device, for the connection device, a packet transfer path having the port number assigned to the access router by the port resource assigning device.

9. The address-sharing method, according to claim 8, further including:
rewriting by the connection device, in a case of having a Network Address and Port Translator (NAPT) function, the port number included in a header of the packet into a private port number usable in the network other than the global network; and
controlling, by the connection device, in a case of not having the NAPT function, the port number to be used by the connection device.

10. The address-sharing method, according to claim 8, further including
controlling by the port resource assigning device, the number of port numbers to be assigned to each user.

11. The address-sharing method, according to claim 8, further including
assigning by the port resource assigning device, when requested to assign the port number by the connection device, a plurality of port numbers.

12. The address-sharing method, according to claim 8, further including
using by the connection device the port number assigned to the connection device for a different communication session.

13. A non-transitory recording readable medium which stores a program executable by a computer to perform the following, comprising:
managing a port number in a unit of the Internet Protocol (IP) address;
when packet transfer is performed between a global network allowing mutual access using only an IP address and a network other than the global network, assigning the port number managed by an IP address preliminarily provided for an access router performing the packet transfer for the sake of the packet transfer,
wherein a connection device connects the global network and the network other than the global network,
wherein the access router performs the packet transfer via the connection device, and wherein the connection device, when a communication session for the packet transfer is started, requests the port resource assigning device to assign the port number, and sets, for the connection device, a packet transfer path having the port number assigned to the access router by a port resource assigning device; and when requested to assign the port number, the port resource assigning device assigning a plurality of port numbers.

14. A non-transitory recording readable medium which stores a program executable by a computer to perform the following, comprising:

causing a connection device connected to a global network allowing mutual access using only an Internet Protocol (IP) address and a network other than the global network, and performing packet transfer between the networks using an address and a port number to execute the program;

a procedure where the connection device, in a case of having an Network Address and Port Translator (NAPT) function, performs control that rewrites the port number included in a header of the packet and to be used in the global network into a private port number usable in the network other than the global network;

a procedure where the connection device, in a case of not having the NAPT function, controls the port number to be used by the connection device;

a procedure where the connection device connects the global network and the network other than the global network;

a procedure where the access router performs the packet transfer via the connection device; and a procedure where the connection device, when a communication session for the packet transfer is started, requests the port resource assigning device to assign the port number, and sets, for the connection device, a packet transfer path having the port number assigned to the access router by the port resource assigning device.

* * * * *